United States Patent [19]

Flickinger et al.

[11] 4,144,410
[45] Mar. 13, 1979

[54] MULTIPLEX COMMUNICATION SYSTEM

[75] Inventors: Charles E. Flickinger, Dousman; Russell P. Schuchmann, Milwaukee, both of Wis.

[73] Assignee: Cutler-Hammer, Inc., Milwaukee, Wis.

[21] Appl. No.: 841,219

[22] Filed: Oct. 11, 1977

[51] Int. Cl.² .............................................. H04J 3/08
[52] U.S. Cl. ............................................... 179/15 AL
[58] Field of Search ........ 179/15 AL, 15 BA, 15 AT, 179/15 BS; 340/172.5

[56] References Cited

U.S. PATENT DOCUMENTS

| | | | |
|---|---|---|---|
| Re. 28,958 | 9/1976 | Zafiropulo et al. | 179/15 AL |
| 3,519,750 | 7/1970 | Beresin et al. | 179/15 AL |
| 3,569,632 | 3/1971 | Beresin et al. | 179/15 AL |
| 3,755,789 | 8/1973 | Collins | 179/15 AL |
| 3,879,582 | 4/1975 | White et al. | 179/15 AL |
| 3,879,710 | 4/1975 | Maxemchuck et al. | 179/15 AL X |
| 3,919,484 | 11/1975 | Maxemchuck | 179/15 AL |
| 4,007,441 | 2/1977 | Faber | 179/15 AL |
| 4,032,893 | 6/1977 | Moran | 179/15 AL |
| 4,035,770 | 7/1977 | Sarle | 179/15 AL |

Primary Examiner—Thomas A. Robinson
Attorney, Agent, or Firm—Schroeder, Siegfried, Ryan, Vidas & Steffey

[57] ABSTRACT

A reconfigurable serial loop multiplex communication system for communication of digital and analog status and control information between field terminal locations or to a central control location via a twisted pair line. Input modules in a first terminal station communicate signals received at their input to output modules having the same byte address in other terminal stations. At the central control locaton, signals from an input module may be readdressed for communication to output modules having a different byte address.

28 Claims, 23 Drawing Figures

SIMPLE SYSTEM ( SINGLE CHANNEL )

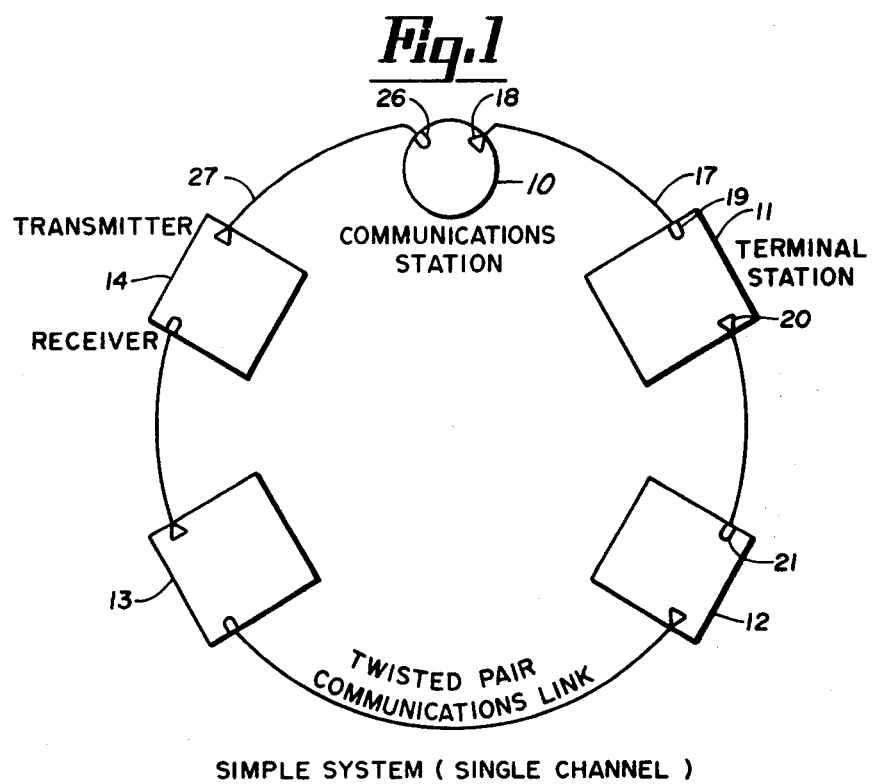
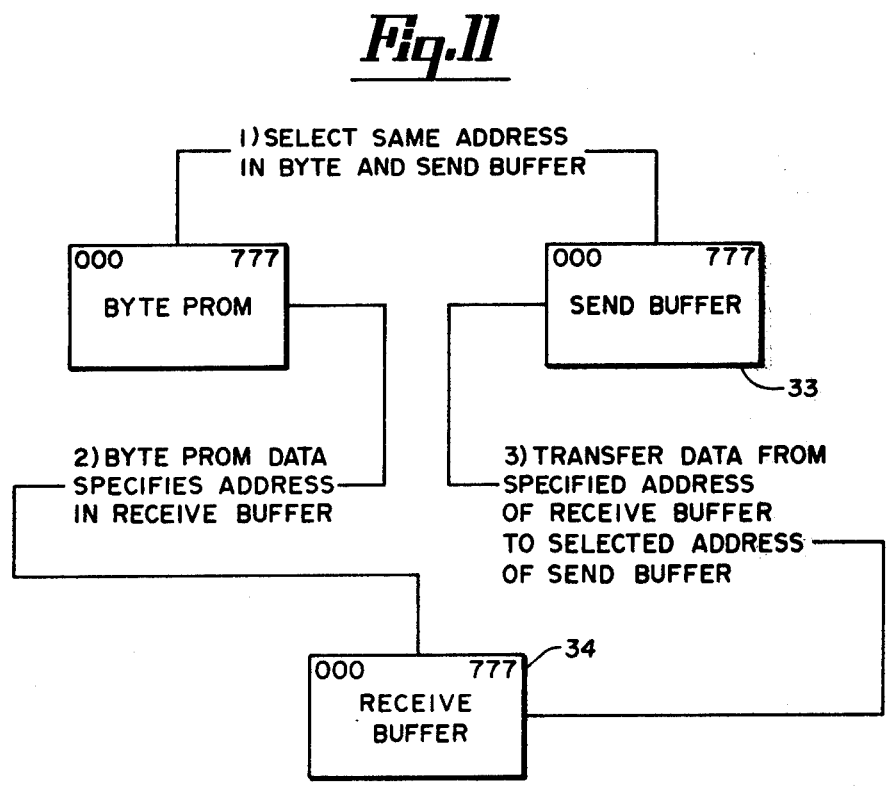

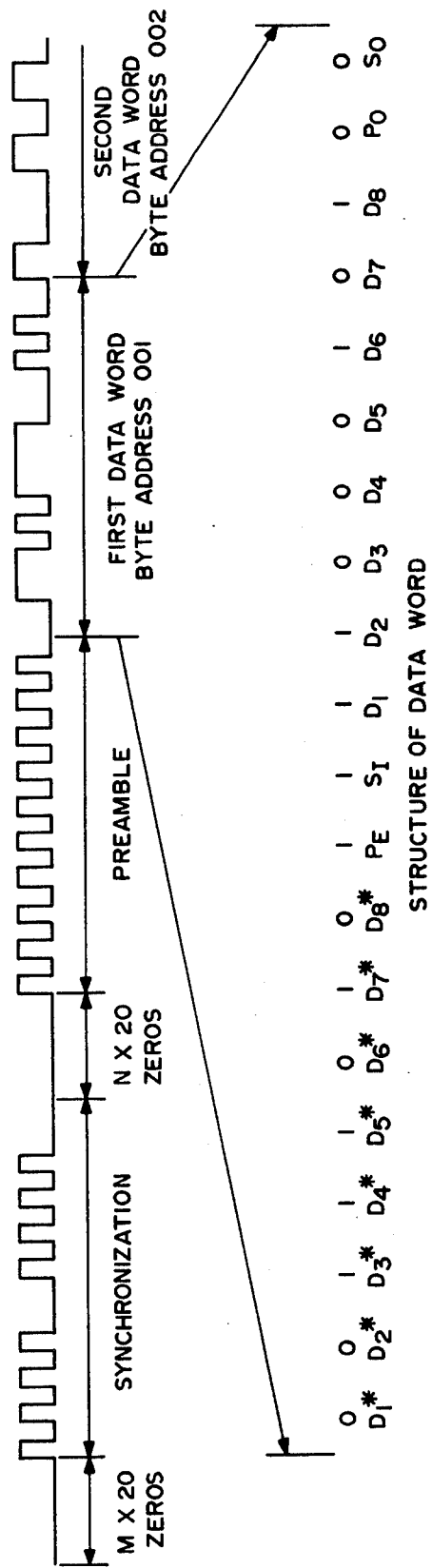

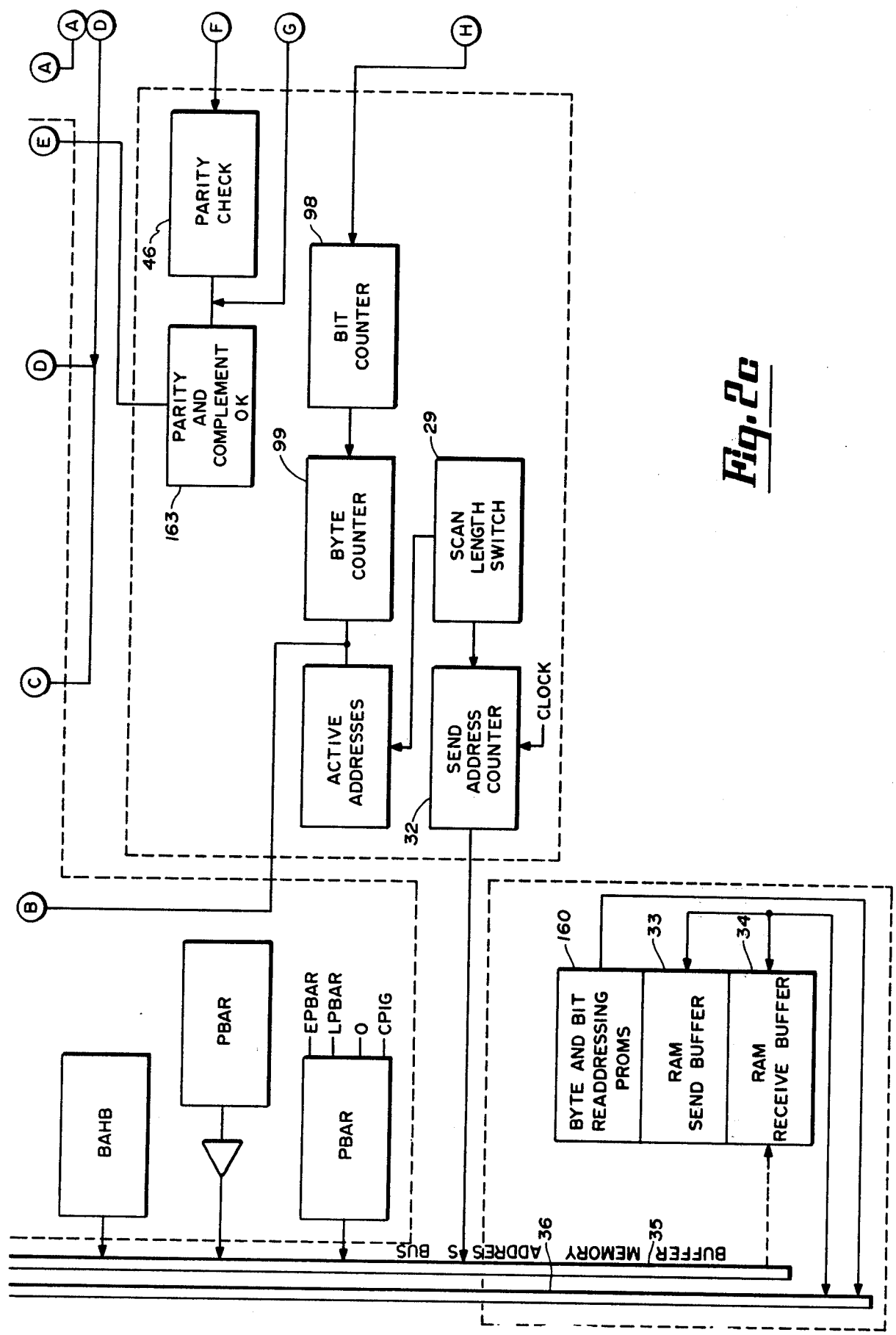

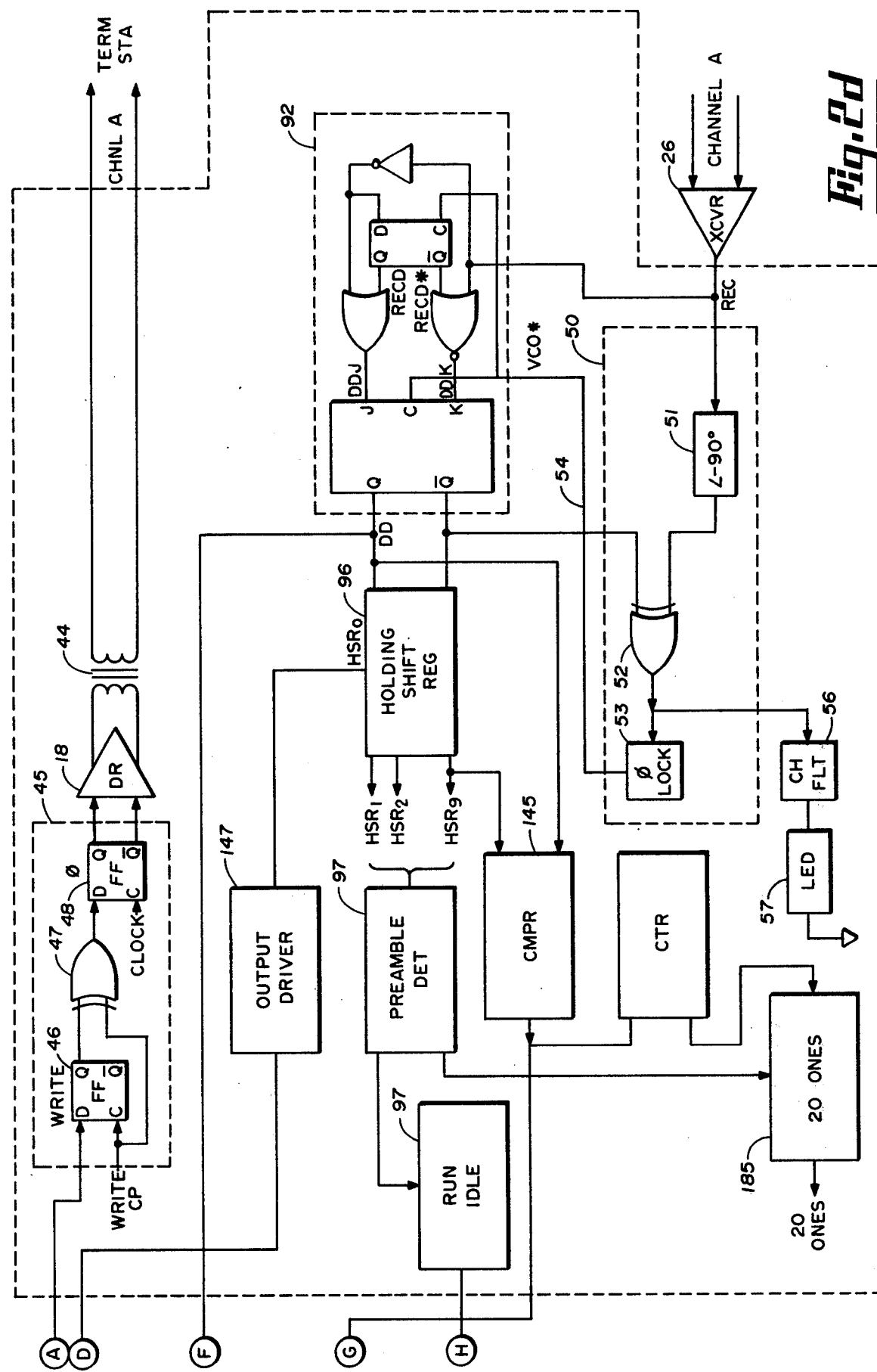

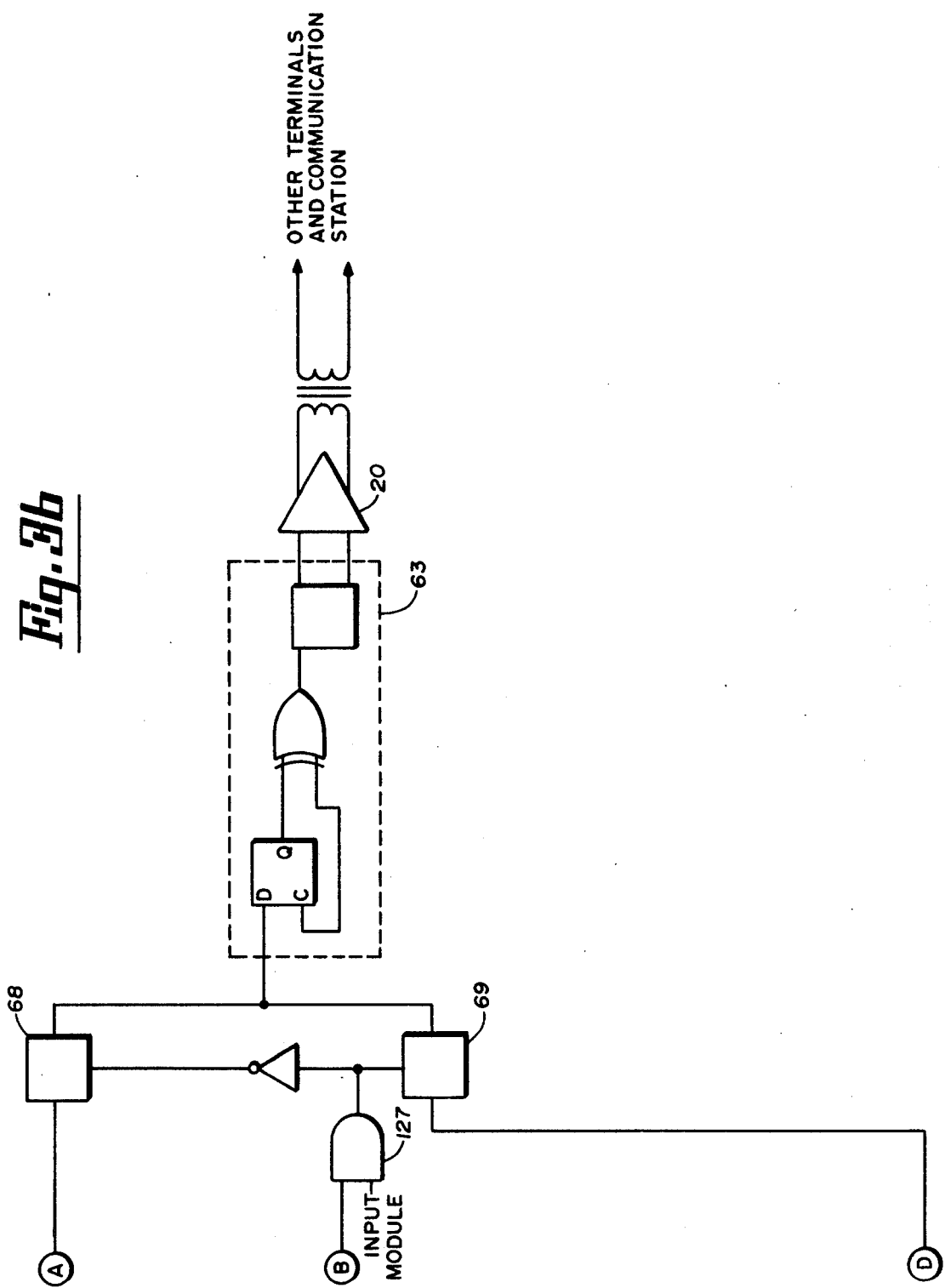

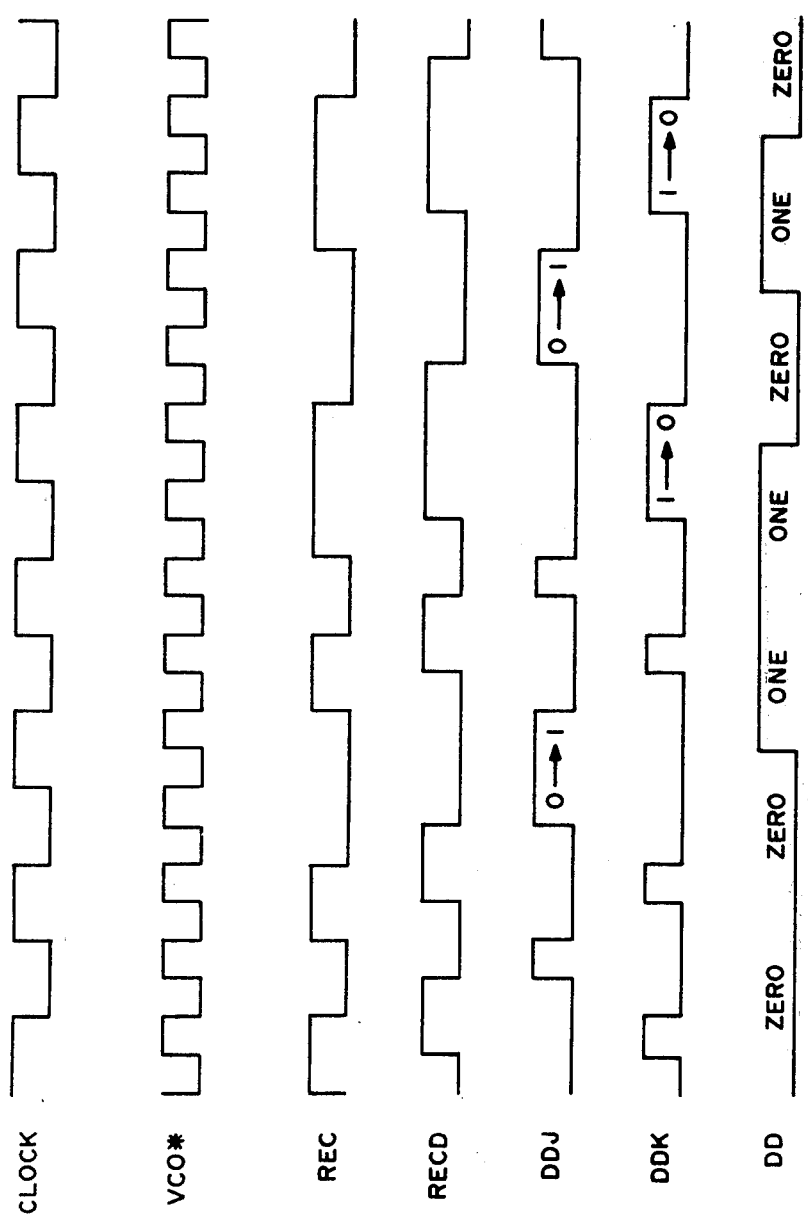

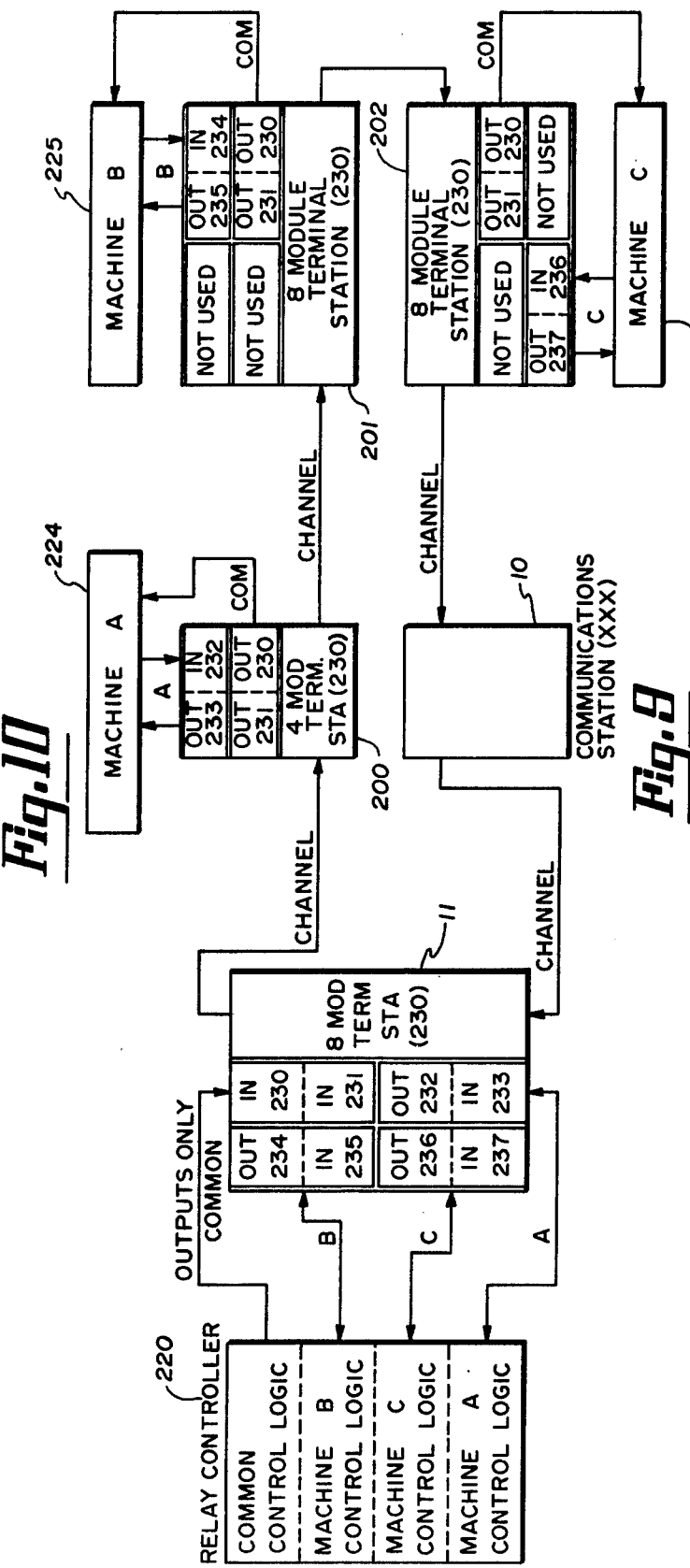

Fig. 12

| BUFFER BITS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| BUFFER CONTENTS | $D_0$ | $D_1$ | $D_2$ | $D_3$ | $D_4$ | $D_5$ | $D_6$ | $D_7$ | $ISB_0$ | $OSB_0$ | $ISB$ | $OSB$ | $P_M$ | $CB_2$ | $CB_1$ | $P_B$ |
| | DATA BITS | | | | | | | | STATUS AND FAULT CODES | | | | | | | |

| $P_M$ | $CB_2$ | $CB_1$ | ENCODED MESSAGE FAULTS |
|---|---|---|---|
| 0 | 0 | 0 | NO FAULTS ON LAST THREE SCANS |
| 1 | 1 | 1 | LAST MESSAGE INVALID (BAD PARITY AND/OR REDUNDANCY CONFLICT) |
| 1 | 1 | 0 | LAST TWO MESSAGES INVALID |
| 1 | 0 | 1 | THREE OR MORE MESSAGES INVALID * |
| 1 | 0 | 0 | FAULT ACKNOWLEDGED BY MONITOR PANEL OR COMPUTER |
| 1 | 1 | 0 | ISB/OSB ≠ ISB /OSB  FOR LAST MESSAGE |
| 0 | 0 | 1 | "                    FOR LAST TWO MESSAGES |
| 0 | 1 | 0 | "                    FOR THREE OR MORE MESSAGES |
| 0 | 1 | 1 | |

\* FAULT SIGNAL

Fig.13

| BIT FAULTS DISPLAYED | PROBABLE CAUSE IF FAULT IS DISPLAYED FOR: | |
|---|---|---|
| | ISOLATED MODULE OR MODULES | ALL MODULES IN A TERMINAL STATION |
| INITIAL STATUS BIT = 1 BUT CURRENT STATUS BIT = 0 | MISSING MODULE (ALSO MAY BE BLOWN FUSE IF MODULE IS A FUSED OUTPUT MODULE) | TERMINAL STATION OFF LINE OR TERMINAL STATION POWER OFF |
| INITIAL STATUS BIT WAS INPUT (OR OUTPUT) BUT CURRENT STATUS BIT IS OUTPUT (OR INPUT) | 1) MODULE IS CHANGED FROM INPUT TYPE TO OUTPUT TYPE OR VICE VERSA 2) STATION ADDRESS ALTERED | |
| INITIAL STATUS BIT = 0 BUT CURRENT STATUS BIT = 1 | MODULE ADDED WHERE THERE WAS NONE INITIALLY | TERMINAL STATION WHICH WAS OFF LINE HAS COME ON |
| INPUT STATUS BIT = 1 AND OUTPUT STATUS BIT = 1 | COMPLEMENTARY MODULE PAIRS (ONE INPUT, ONE OUTPUT) INSTALLED IN TWO SEPARATE TERMINAL STATIONS WITH SAME ADDRESS FOR BOTH MODULES OF THE PAIR | TWO TERMINAL STATION WITH SAME ADDRESS A COMPLEMENTARY I/O MODULE PAIR'S THROUGHOUT |
| $P_m = 1$ BUT NO STATUS BIT ERRORS | PARITY ERROR OR REDUNDANCY CONFLICT | TERMINAL STATION POWER SUPPLY VOLTAGE LOW OR TEMPERATURE HIGH |

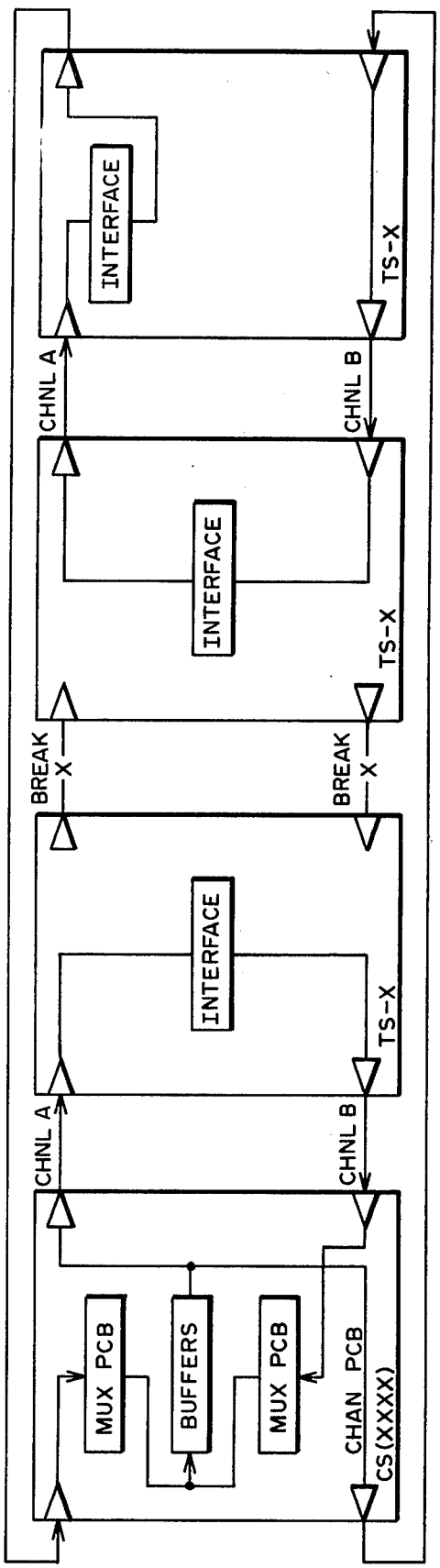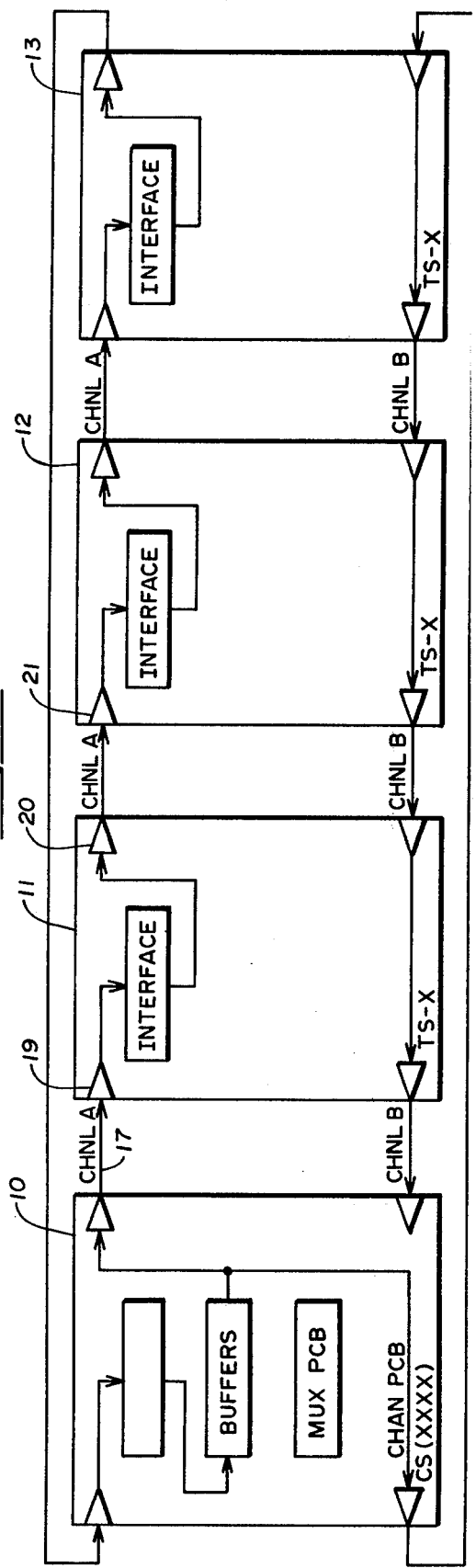

Fig. 16

FIRST DATA TRAIN

| | $D_1$* | $D_2$* | $D_3$* | $D_4$* | $D_5$* | $D_6$* | $D_7$* | $D_8$* | $P_E$ | $S_I$ | $D_1$ | $D_2$ | $D_3$ | $D_4$ | $D_5$ | $D_6$ | $D_7$ | $D_8$ | $P_O$ | $S_O$ |
|---|---|---|---|---|---|---|---|---|---|---|---|---|---|---|---|---|---|---|---|---|
| | 1 | TAG* | | | 5 MOST SIGNIF. BITS* | | | | $P_E$ | $S_I$ | 0 | TAG | | | 5 MOST SIGNIF. BITS | | | | $P_O$ | $S_O$ |
| | 1 | 2 | 3 | 4 | 5 | 6 | 7 | 8 | 9 | 10 | 11 | 12 | 13 | 14 | 15 | 16 | 17 | 18 | 19 | 20 |

SECOND DATA TRAIN

| | $D_1$ | $D_2$ | $D_3$ | $D_4$ | $D_5$ | $D_6$ | $D_7$ | $D_8$ | $P_E$ | $S_I$ | $D_1$ | $D_2$ | $D_3$ | $D_4$ | $D_5$ | $D_6$ | $D_7$ | $D_8$ | $P_O$ | $S_O$ |
|---|---|---|---|---|---|---|---|---|---|---|---|---|---|---|---|---|---|---|---|---|
| | 0 | 9 LEAST SIGNIFICANT BITS* | | | | | | | $P_E$ | $S_I$ | 1 | 7 LEAST SIGNIFICANT BITS | | | | | | | $P_O$ | $S_O$ |
| | 1 | 2 | 3 | 4 | 5 | 6 | 7 | 8 | 9 | 10 | 11 | 12 | 13 | 14 | 15 | 16 | 17 | 18 | 19 | 20 |

MULTIPLEX COMMUNICATION SYSTEM

The present invention concerns a time division multiplex system for transporting data between different physical locations by multiplexing the data and transmitting it on a communications channel formed by a twisted pair cable. The various field terminal locations are linked in a communications loop with a communications station which initializes communications on the channel and allows for selection of system signal capacity.

Information carried by the system may be multiplexed directly from one field terminal location to another field terminal location by assignment of the same byte address to complementary input/output or I/O modules; one an input module, the other an output module. In the system, all information handled by the multiplexer is available at the communications station for monitoring and/or control by external control means including a general-purpose computer, a programmable logic controller, a wired or static logic network, a conventional analog controller, or a push-button panel.

The multiplex system is a self-sufficient system which operates independently of a computer or other control means which may be selected by the user to interface with the system.

The basic elements of the multiplex system are a communications station, one or more terminal stations, and, if desired by the user, an optional monitor panel which interfaces with the communications station.

The user installas the system by selecting an appropriate byte address for each terminal station, inserting input or output (hereinafter I/O) modules into the proper positions in each terminal station, connecting the terminal stations in a series loop with the communications station by a shielded, twisted pair cable, and by connecting the terminal input and output modules to the apparatus whose operation is being controlled and/or monitored by the multiplex system.

The communications station generates and regulates a train of digital pulses which is transmitted to each terminal station in turn. Each terminal station contains circuitry for locating the particular data bytes in the data train intended for the byte addresses associated with that particular terminal station. At a terminal station, the portion of the pulse train with bytes corresponding to the addresses of the I/O modules within the terminal station is either updated by the current status of the corresponding input signals received from equipment located external to the system or the data carried by the pulse train is used to update the status of the appropriate output control functions. In either case, parity and status pulses included in the data word are adjusted to acknowledge proper receipt and execution of the signal by the module or to report and fault conditions associated with the particular terminal station or communications link.

As the returning data train is received at the communications station, it is examined for evidence of noise and equipment malfunction before the next data train is transmitted. The scanning period of the system allows time for the communications station to trasmit, receive, examine, and store a complete data train.

The terminal stations include one or more I/O modules which are used either to convert data delivered to the terminal station to command functions for the external devices or to receive signals from the external devices and convert those to digital data for insertion into the data train in the byte address position corresponding to the address assigned to the terminal station.

The system is self-configuring in the event of a cable fault by reconfiguring the loop into two separate loops.

The multiplexe system includes several features to assures secure communications. The pulse train utilized in the system incorporates redundant transmission of data and parity checks for error detection. Each group of eight data bits representing the eight signals associated with a particular input/output module are transmitted on the communications link as a 20-bit message. The first half of the message contains redundant data bits which are the complements of the actual data bits, a parity check bit, and an input status bit. The second half contains the true data bits, a parity check bit, and the output status bit.

Each terminal station tests the validity of the output data addressed to it by checking the parity bits and comparing the redundant complemented data word with the uncomplemented data word. If all messages for a terminal station's outputs are valid, the new outputs will be transferred through the output modules as updated output signals. If one or more output bytes exhibit bad parity or any mismatch between the complemented and uncomplemented data words, then none of that terminal station's output signals will be updated. Messages associated with the terminal station's input signals are not tested at the terminal station. The station updates the portion of the data train corresponding to the address of that station to reflect the current state of the input signals and sets the parity accordingly.

At the communications station, the complete returning data pulse train is also examined. An error in the returned message activates a polling counter. The counter triggers a fault alarm whenever three consecutive scans have exhibited parity errors.

Another counter in the communications station is activated by discrepancies between the newly received status bits and a stored record of initial status bits. Individual status bit errors identify missing or defective modules. A by-passed terminal station (due to loss of power or electronic failure) is characterized by having all status bits in error. The conditions of having all odd status bits wrong or all even status bits wrong are used as codes to identify other terminal station malfunctions. This allows the communications station to identify defective terminal stations and to determine the nature of a defect.

In addition to activating fault alarm and identifier signals, the communications station inhibits the propagation of data with bad parity. This is accomplished by rejection of the bad message segment and replacing that data byte with the last correct data as stored in the communications module.

The terminal station which receives a pulse train with bad parity for any of its output addresses reacts as described above, rejecting all output messages contained in the scan and maintaining the last valid set of output signals. Should bad output parity persist for more than 125 milliseconds at any terminal station, the station transfers to standby operation. In standby operation, three things occur: (1) Outputs are all either de-energized or maintained at their last valid status depending upon the failure mode selected for each station.

(2) An alarm relay in the terminal station power supply is actuated to permit user-implemented coordination of other stations or related equipment, or to activate an emergency backup or shutdown control.

(3) The terminal station continues to operate by retransmitting all signals connected to its input modules. It reverts to normal operation when a message with not output data parity errors is received.

The invention will now be described in more detail, by way of examples only and with reference to the accompanying diagrammatic drawings in which:

FIG. 1 is a block diagram of the simple system.

FIGS. 2a through 2d comprise a block diagram of the circuitry of the communications station and are oriented relative to each other as shown in FIG. 2.

FIGS. 3a and 3b comprise a block diagram of the circuitry of a terminal station and are oriented relative to each other as shown in FIG. 3.

FIG. 4a is a diagram showing the relationships between the various signals in the system, and FIG. 4b shows the structure of the synchronization, preamble, and data words.

FIG. 9 is a table of byte and signal address ranges for certain selected signal capacities.

FIG. 10 is a diagram of a simple system utilizing complementary addressing.

FIG. 11 is a block diagram showing the operation of the byte readdressing, programmable, read-only memory.

FIG. 12 shows the structure of the information stored in the SEND and RECEIVE buffers for each I/O module address.

FIG. 13 shows the status/fault code interpretation.

FIG. 14 is a block diagram of a reconfigurable communications channel.

FIG. 15 is a block diagram of a communications channel reconfigured to "repair" a broken cable.

FIG. 16 is an illustration of the transmission protocol for analog signal transmission.

SIMPLE MULTIPLEX SYSTEM

Figure 2A:
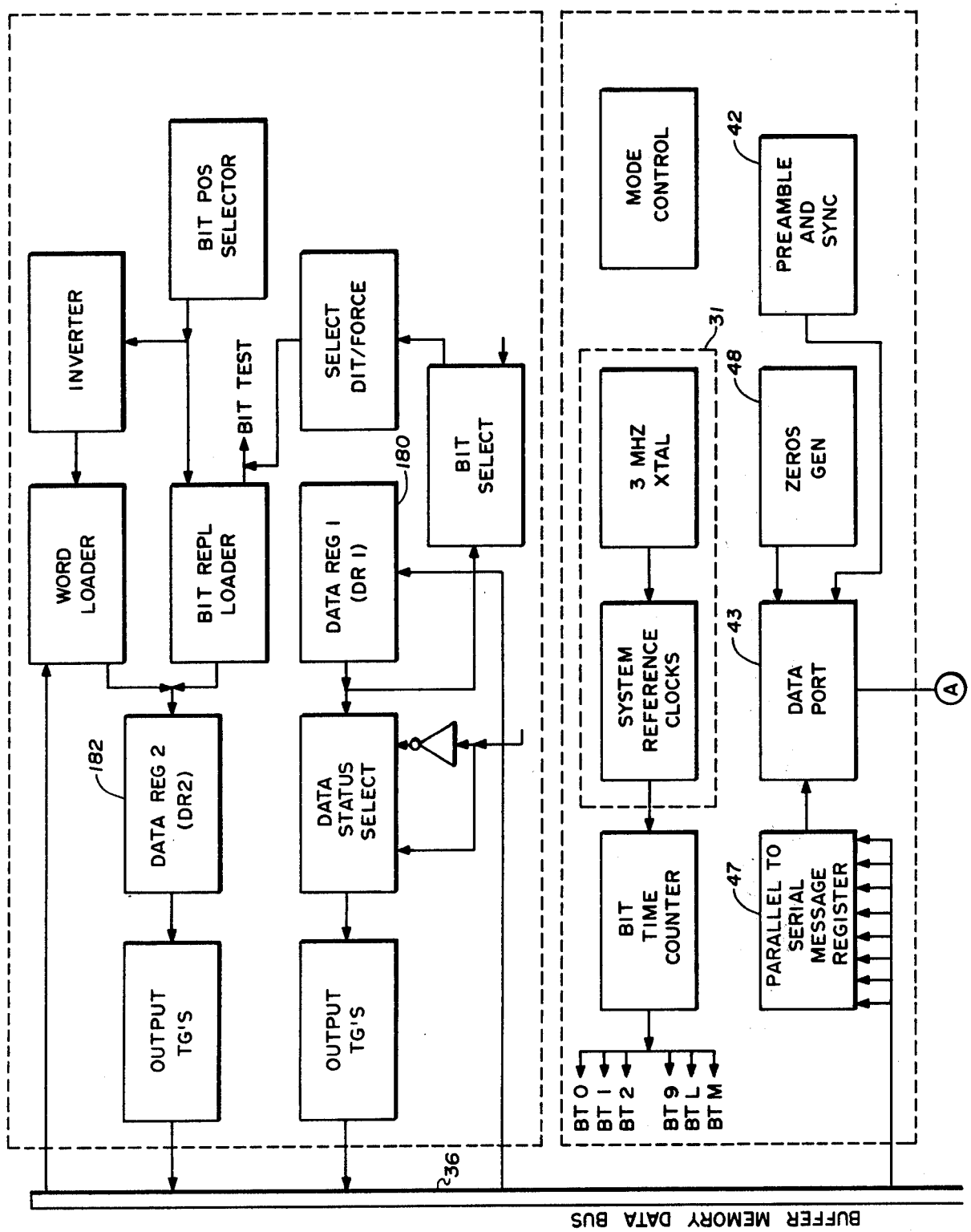
Figure 2B:
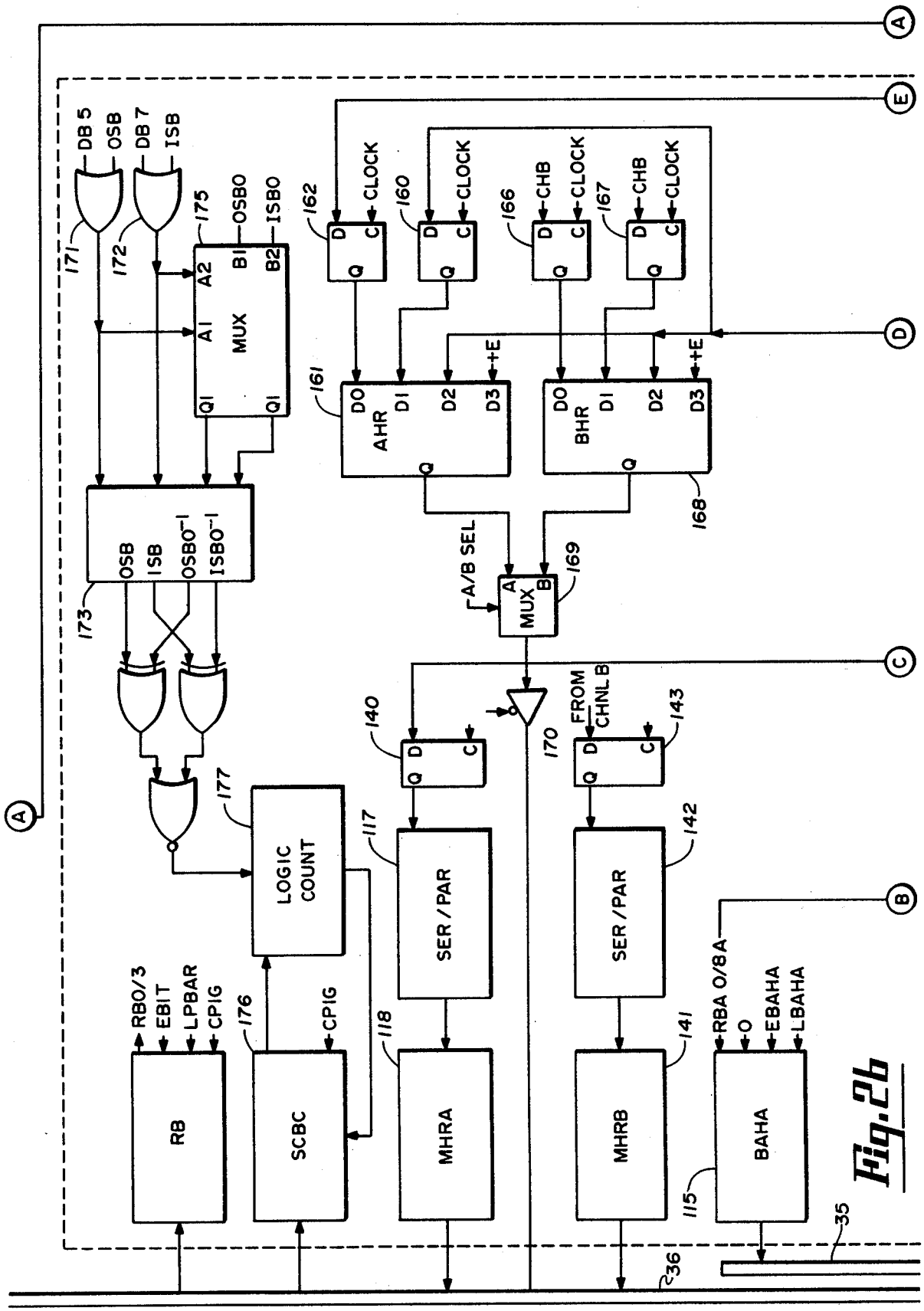

FIG. 1 is a simplified block diagram of the multiplex system showing a communications station 10 and terminal stations 11, 12, 13, and 14 configured in a closed communications loop. Transmitter, or line driver, 18 of communications station 10 deliveres data to a shielded twisted pair communications link 17. Communications link 17 is in turn connected to receiver 19 of terminal station 11 which has its transmitter 20 connected to receiver 21 of terminal station 12. Each of terminal stations 11, 12, 13, and 14 includes a receiver and transmitter. Additional terminal stations up to a system maximum of 128 terminals can be added with a maximum communications link distance of 5,000 feet between terminals.

The amount of cable necessary to interconnect all of the terminal stations for intercommunication is minimized by use of the "loop" configuration for the system. Connecting the terminal stations with a loop interconnection scheme minimizes the amount of cable necessary compared to prior art "wagon wheel" systems requiring separate communications links between the central station and each of the terminal stations. Use of a time division multiplexing arrangement permits use of a single two-conductor cable to carry a large number of signals rather than use of a data bus having 8, 16, or more conductors.

Generation of Data Train in the Communications Station

Figure 3A:
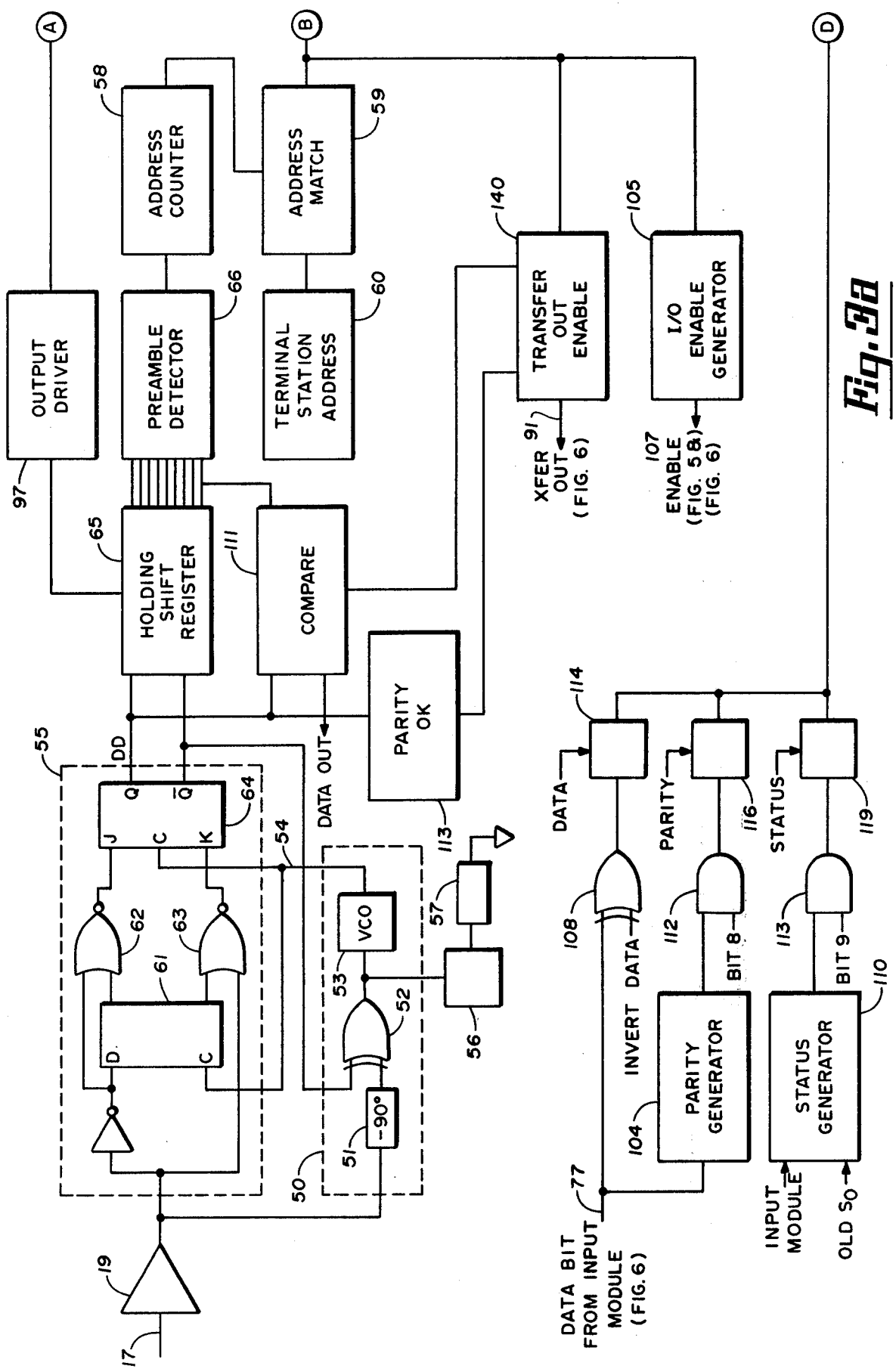

FIGS. 2a through 2d are a detailed block diagram of communications station 10, including transmitter 18 and receiver 26, communicating with a terminal station 11 as shown in FIGS. 3a and 3b Communications station 10 is included in the communications loop to initiate communications between terminal stations, to control selection of the signal capacity for the control loop, and to serve as an interface between the system and an external control computer or other external controller. To alter the system signal capacity, a four-position scan length switch 29 is used to select signal capacities. Thus, signal capacities of 512 bits, 1,024 bits, 2,048 bits, or 4,096 bits can be selected for the system. For each of these signal capacities there is a corresponding transport time required to multiplex and communicate all of the signals between all terminal stations. The transport time for 512 bits is 3 milliseconds, for 1,024 bits — 6 milliseconds, for 2,048 bits — 12 milliseconds, and for 4,096 bits — 24 milliseconds. The signal capacities for the various ranges are as shown in FIG. 9.

A crystal controlled master clock 31 is utilized to generate the clock signals used to operate communications station 10. That clock signal is connected to a SEND address counter 32 which is controlled by scan length switch 29 to select the desired signal capacity. SEND address counter 32 then generates the sequence of byte addresses on buffer memory address bus 35 which are used to read the train of data words from their locations in the random access memory (RAM) SEND buffer 33 onto the buffer memory data bus 36. The number of byte addresses generated by counter 32 is determined by the scan length selected by the scan length switch 29.

Data is transmitted between communications station 10 and each of the terminal stations on communications link 17 using a biphase or Manchester encoding format. In this scheme, the 500-kilohertz clock signal generated by master clock 31 is transmitted directly with no phase shift to represent a digital ZERO and is transmitted with a 180°-phase inversion to represent a digital ONE as illustrated in FIG. 4a. This biphase data format provides an advantage because the clock signal is transmitted with the data and can be recovered from the data stream after receipt in the terminal station. Each terminal station includes a phase lock loop circuit which detects the clock signal in the received data and acts as a local clock.

A further advantage of the coding system is that the signal has a ZERO long-term averge DC component making it possible to utilize isolation transformers between terminal stations to reduce noise. A further advantage is that the encoded signal is readily generated for transmission and decoded after receipt. The format also assurs that transmited data cannot get "out of sync" with its clock.

FIG. 4b shows the data transmission protocol used to transmit the data through the system. Before the beginning of a data train, the system generates a train of ZEROS. Prior to transmission of the first data word, the system transmits a synchronizing 20-bit word which comprises two 10-bit sequences consisting of a series of four alternating ONES and ZEROS followed by a pair of ZEROS. The synchronizing word is used to synchronize the operation of the phase lock loop circuit to the proper phase. The synchronizing work is followed by a string of words comprised of 20 ZEROS and then the preamble word. The number of words containing all ZEROS both before and after the synchronizing word is determined by the amount of time required to be spent by the system in performing other data manipulating and readdressing operations as described below.

The preamble word comprises ten alternating ONES and ZEROS and is transmitted immediately prior to the transmittal of the first data word. After transmission of the ZEROS, the synchronizing word, the further ZEROS, and the preamble word, the fist data word is transmitted when the first address location in RAM SEND buffer 33 is addressed by SEND address counter 32.

As shown in FIG. 2a, communications station 10 generates the transmission protocol via switch 43 which selcts signals from the ZEROS generator 40, the preamble and sync generator 42, and the message register 47. Message register 47 is a parallel to serial register which receives its contents from buffer memory data bus 36 and RAM SEND buffer 33. The data stored in SEND buffer 33 is read out in parallel form to buffer memory data bus 36 and to message register 47 which has its serial output connected to switching circuit 43. Switching circuit 43 drives phase encoder 45 with appropriate signals according to the protocol in FIG. 3b.

The format or protocol of the data words allows them to be checked readily by the receiving circuitry. As shown in FIG. 4b, each data word is divided into 20 bit times. During bit times 0-8, an 8-bit data item is transmitted in inverted or complemented form and is followed by an even parity bit an an input status bit. During bit times 11-18, the uninverted data word is transmitted followed by an odd parity bit and an output status bit. The checking of the data words and the use of the status bits is discussed in more detail below.

Swiching unit 43 is used to transmit one or more words comprised of 20 ZEROS to phase encoder 45 to commence the transmission cycle and then switches to sync generator 42 to generate the required ONES and ZEROS to form the synchronization word, back to unit 43 for additional ZEROS, and to generator 40 to form the preamble word and then switches to message register 47 to serially read the data word previously read into that register from SEND buffer 33. The generation of the sync and preamble signals is readily mechanized using standard circuits.

For the initial data train after the system is started up, each data work in RAM SEND buffer 33 contains all ZEROS as it leaves communications station 10 and is updated on a byte-by-byte basis at the appropriate terminal stations by the contents of the input buffers at the terminal stations having the appropriate byte address. The initial input and output status bits are also updated and the updated signals are returned to communications station 10.

FIGS. 2a through 2d and 3a and 3b have been simplified since they show the transmitting and receiving circuitry for only the A channel or primary channel and do not include the identical circuitry used for the backup of B channel. The switchover from channel A to channel B of the system to reconfigure the system in the presence of communications channel or certain other failures is discussed under the heading "Reconfigurable System" below.

The phase encoder circuit 45 codes the data for transmission through the system. Data from the switching unit 43 is connected to a write flip-flop 46 which is clocked by a signal which, in communications station 10, is derived from the crystal controlled system clock. This signal is at the 500-KHz frequency in which the data is transmitted on the line. Write flip-flop 46 is used to provide a "clean" signal to be used for the Manchester phase encoding. The phase encoding is performed by connecting the data signal from flip-flop 46 and the clock pulse to drive the inputs of an exclusive OR 47 which provides a phase encoded output in the Manchester code format. Because of the possibility of propagation delays in the system causing undesired phase shifts of the coded data, the output of exclusive OR 47 is clocked through a phase-correcting flip-flop 48 which is clocked by a signal derived from the reference clock and which has a frequency of 1 megahertz, twice the frequency of the transmitted data.

The Manchester coded data train from phase encoder 45 is sent by a transmitter 18 through an isolation transformer 44 and along communications link 17 to receiver 19 of terminal station 11 shown in FIG. 3a and 3b.

Receipt of Data Train in Terminal Station

In terminal station 11, the signal from receiver 19 is connected to the input of a phase lock loop clock circuit 50 and to a data decoder 55. Phase lock loop circuit 50 is comprised of a phase-shifting circuit 51 which shifts the phase of the input signal by −90° and then transmits it to a comparator circuit 52 which is connected to receive an inverted decoded signal output from data decoder 55. The output signal from comparator 52 is connected to the input of voltage-controlled oscillator 53 which has its output signal connected to the clock input of data decoder 55. Phase lock loop circuit 50 operates at a frequency twice the normal clock frequency of the system. A further logic circuit 56 and an indicator 57 are used to monitor the operation of phase lock loop 50 and will generate a "channel fault" signal on indicator 57 when logic circuit 56 detects loss of phase lock. The "channel fault" indication is used in the reconfigurable system to reconfigure the system into a two-loop system as discussed under the heading "Reconfigurable System" below.

Data detector 55 operates by using a D-type flip-flop 61 whose outputs drive NOR gates 62 and 63 which compare those outputs to the encoded signal or its inverse and drive a JK flip-flop 64. Both flip-flops 61 and 64 are clocked by the VCO output 54 from phase lock loop 50. The Q and $\overline{Q}$ outputs of flip-flop 64 respectively represent the decoded data and the complement or inverse of the decoded data.

The pattern of four alternating ZEROS and ONES and the double ZERO of the synchronizing word serve to synchronize phase lock loop 50 to generate a clock signal on conductor 54 having a frequency twice that of the signal frequency for use by data decoder 55 to decode data after the data words following the preamble word begin to be received at receiver 19. The decoded pulse data train from decoder 52 is connected to a serial to parallel register 65 which has its parallel outputs connected to preamble detector 66 which senses the preamble word and then activates address counter 58 to count the byte address of the data words being received.

The output of address counter 58 is incremented once for each message byte received after identification of the preamble word. A comparison circuit 59 compares the address contained in address counter 58 to the terminal station address set into terminal station address selector switch 60 by the user when he assigned addresses to each of the terminal stations in the system.

During the portions of the data train in which the byte address in address counter 58 does not match the address dialed into terminal station address switch 60, the terminal station output phase encoder 63 is connected through an enabled transmission gate 68 and an output driver 97 to a serial output of shift register 65 so that output phase encoder 63 receives the incoming decoded pulse data in unmodified form. The terminal station phase encoder 63 is identical to communications station phase encoder 45 except that its clock signals are derived from the terminal station phase lock loop circuit 50 rather than the crystal clock 31. Thus, when the byte address of the word being received at terminal station 11 does not match that selected for the terminal station by selector switch 60, the terminal station merely retransmits those data bytes without change.

When comparator 59 detects correspondence of the byte address in address counter 58 and the address range of the modules in that station as selected on switch 60, and if the module is an input module, transmission gates 68 and 69 are then switched to connect the input of phase encoder 63 to receive data from one of the input modules contained in that terminal station. The control input to transmission gates 68 and 69 is provided by AND gate 71 which receives one input from comparator 59 and a further logic signal which indicates that the module at the address location corresponding to the address stored in counter 58 is an input module used to receive data from apparatus outside of the system.

Figure 5:
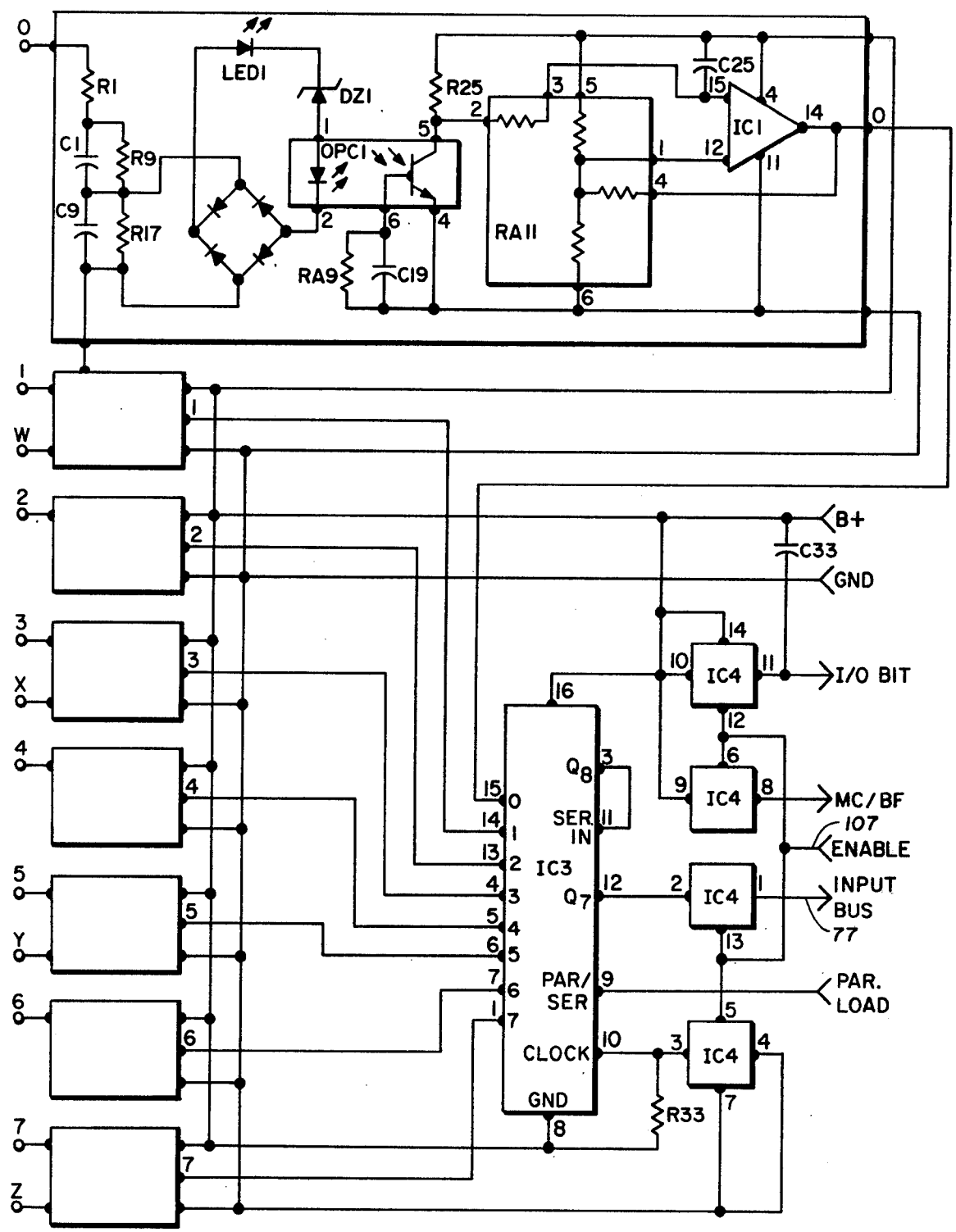
FIG. 5 is a diagram of a DC input module.

Input data is received from the input module bus, as shown for example in the DC module of FIG. 5, and is fed in serial form into an exclusive OR 108 so that its data may be transmitted in time or complemented form. Other input modules, such as AC input modules, can also be constructed in an analogous manner without departing from the spirit of our invention. Submultiplex analog input modules (discussed in the section below captioned "Submultiplexing") can also be used to code an analog signal into a digital signal for transmission. Data from the input module is combined with a parity signal generated by parity generator 104 and a status bit generated by status bit circuit 110.

After a match was found between the byte address in address counter 58 and the designated station address, the input/output enable generator 105 provides a train of 16 module enable pulses 107 which are used to read the eight stored data bits from the storage register 80 of the input module into exclusive OR gate 108 two times to generate the 8-bit data item and its complement.

Figure 6:
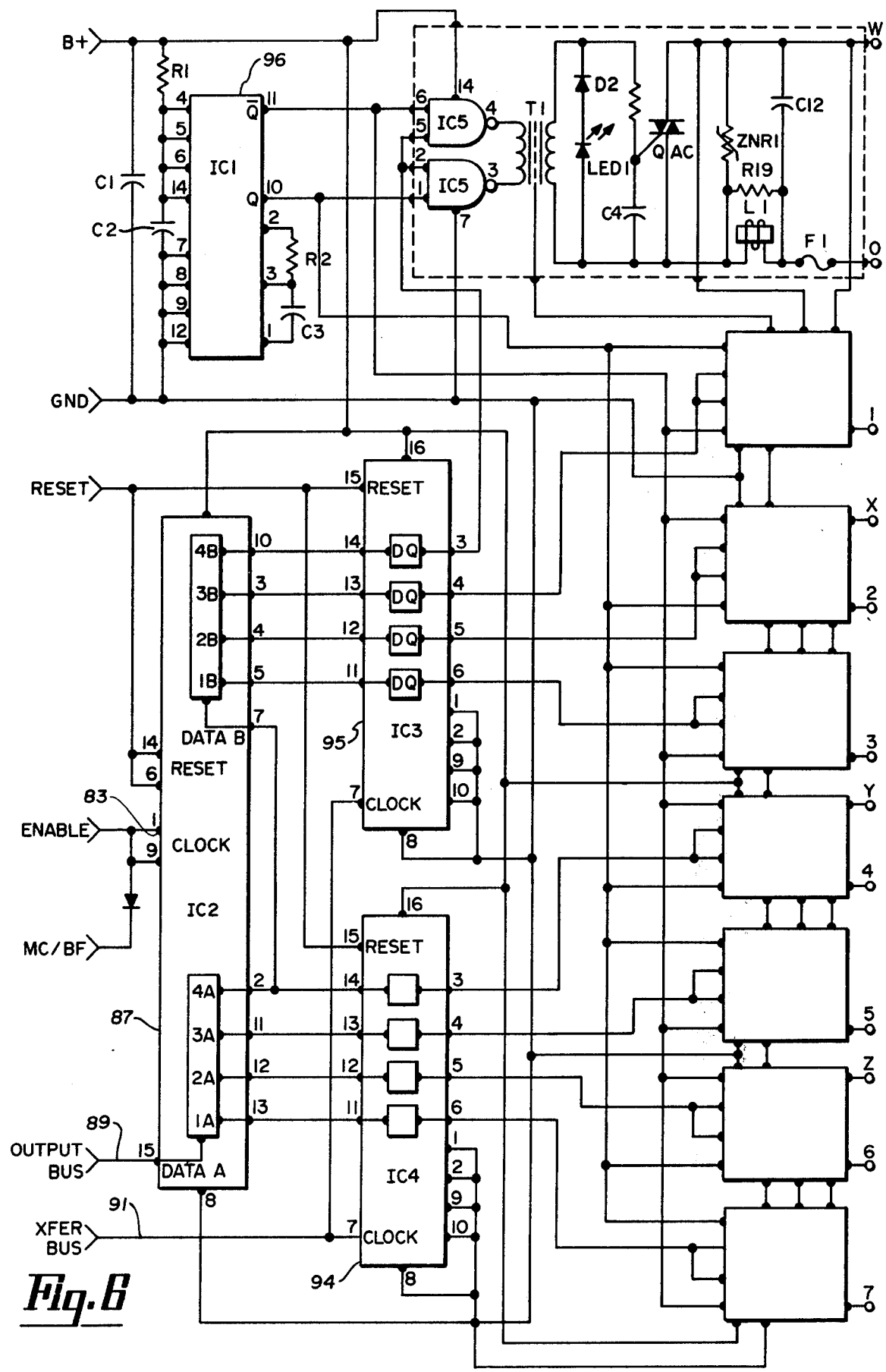
FIG. 6 is a diagram of an AC output module.

During bit times 0–7, the stored data bits from the input module register in FIG. 6 are shifted into the terminal station and exclusive OR gate 108 and inverted when the INVERT DATA input of that gate is enabled. At bit time 8, the even parity bit for the inverted data is inserted by parity generator 104 and AND gate 112. The even parity bit is selected to make the number of ONES in the 8-bit data item together with the parity bit an even number. At bit time 9, a ONE is inserted for the input status bit since this is an input module that is connected. During the second 10 bits of the word, gate 108 is used to transmit the data in uninverted form, and an odd parity bit is inserted by generator 104 at bit time 18, and the old status bit is inserted at bit time 19. Transmission gates 114, 116, and 119 are normally enabled but can be disabled in the presence of certain failures in the system as discussed in more detail below. In the event of an address match when in input module is installed at a particular address, AND gate 127 disables gate 68 and enables gate 125 to pass the current data from input module register 80 to encoding circuit 63 for coding and transmission.

The transfer-out circuit 140 transfers an output data word to an output module having an address corresponding to the byte address of the output data being received only if parity check circuit 113 and a further data integrity checking circuit 111 verify the integrity of the data. Data checking circuit 111 operates by comparing the decoded data at the Q output of flip-flop 64 to the data delayed by 10 bits in holding shift register 65. Since the data item and its complement are both transmitted and shifted by 10 bits, the comparator should always detect the same complementary relationship between the two signals. If both the parity and comparison circuits 110 and 111 indicate that a proper output has been received, the transfer-out circuit 140 is enabled and generates a clock signal (XFER) to load the data from the output module serial to parallel register 87 into the final register 95 in FIG. 6.

Circuitry of Input Module

FIG. 5 shows the circuitry for one input of a discrete input module which receives an enabling signal 107 from I/O module enable generator 105 in FIG. 3a. I/O module enable circuit 105 is activated by address correspondence signals received from comparator 59 which compares the terminal station addresses set into switch 60 with the byte address of the information currently being received as indicated by address counter 58. I/O module enable 105 then provides an enable signal 107 to the particular input or output module in the terminal station whose byte address has been detected in the data train. When an input module is enabled, it delivers its output at terminal 77 for delivery to gate 108 in FIG. 3a.

An input module receives up to eight ON or OFF logic signals from the external devices wired to its input terminals. In an actual system, these ON/OFF logic signals are representative of various control functions which are present at the controlled equipment in the vicinity of a terminal station. The output bits of the input module appear on terminal 77 in FIG. 3a with each of the input ON/OFF logic signals being related to a particular bit position in each byte of the data word. Thus, the input module inserts, in the data train, the input data received concerning the status of the ON/OFF indicators whose signals are received at the input of module 74. The prior data circulating in the system relative to those indicators is replaced with the new data.

Examining FIG. 5 in somewhat further detail, it may be seen that shift register 80 receives eight input signals from individual signal donditioning circuits which are connected to various external monitor points. When the address of the module is reached in the received data train, a PAR/SER signal is applied to terminal 9 of shift register 80 which is a CMOS device no. 34610 as manufactured by RCA and other manufacturers. Terminal 9 is designated by the manufacturer as PAR/SER and "freezes" the state of the input signals O through 7 connected at the shift register input terminals by holding their values in its memory until the readout operation is completed. A train of 16 clock pulses is then received from the output of I/O module enable circuit 105 which are used to read the eight input signals to shift register 80 out onto the output bus 77 to gate 108 where the data is inverted and transmitted to form the data byte for transmission.

Circuitry of Output Module

Further detail of a discrete AC output module is shown in FIG. 6 (with full circuitry shown for only one of the outputs). It will be understood, of course, that a DC output module and end a submultiplex module for coding a digital number into an analog signal may be utilized without departing from the invention herein.

The output module receives an enable signal 83 from the I/O module enable circuit 105 when the address location, at which that module is installed, is reached in the data train received at terminal station 11. The enable signal comprises a string of 16 pulses which begin at the point in time when the address of the module is reached in the data train. The enable signal is used to read the data from holding shift register 65 in FIG. 3a into shift register 87 in FIG. 6, a CMOS 34610 device, from output data bus 89. After the data has been completely read into shift register 87, and the coincidence detection circuit 111 and parity check circuit 113 have indicated that the data was correct and enabled transfer-out circuit 140 to transmit the proper logic command to terminal 91 of the output module, the transfer of the data from shift register 87 to further transfer registers 94 and 95, also CMOS 34610 devices, is accomplished. Thus, the data to be delivered by the output module is double-buffered in the module. It is first assembled and then stored in shift register 87 until its integrity is assured by coincidence detector 111 and parity check 113 and then is moved in parallel to shift registers 94 and 95 for transmission to the drive circuitry for the individual outputs to various control circuits in the system. The output data is also transmitted by the terminal station as received by connecting the data to phase encoder 63 through enabled transmission gate 68.

Figure 7:
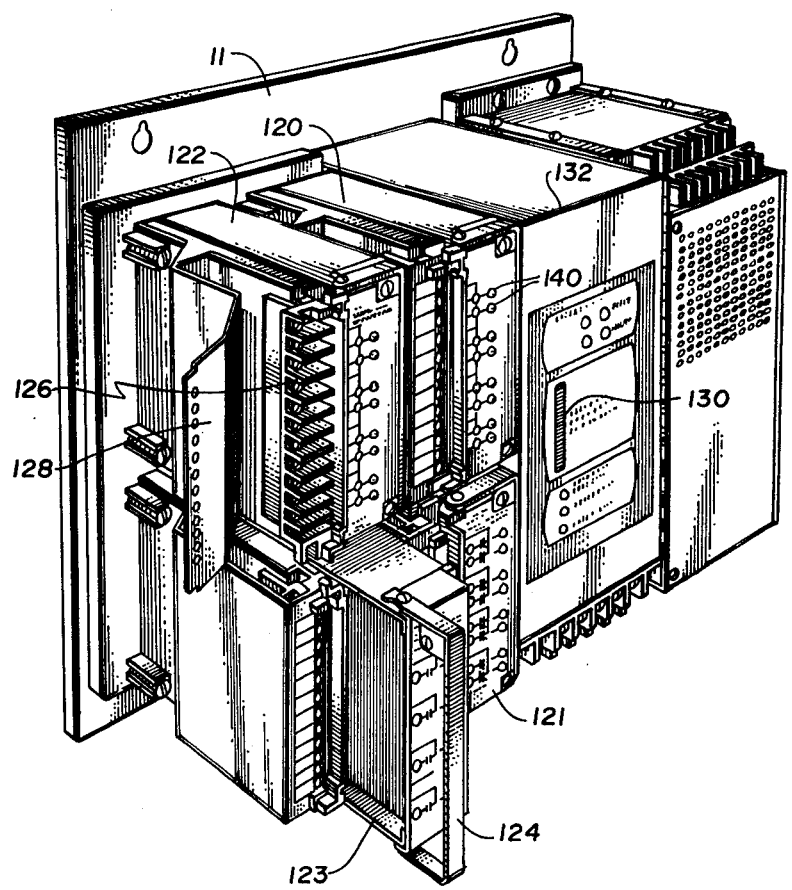
FIG. 7 is a perspective view of the panel of a typical terminal station.

For a particular output circuit, such as output O in FIG. 7, the output signal from terminal 3 of register 95 is connected to the input of two NAND gates which receive their other inputs from terminals Q and $\overline{Q}$ of an astable multivibrator 96, also a CMOS 34610 device connected according to manufacturers' specifications to operate as an astable multivibrator. If the signal is a 1, an AC signal will be applied to transformer $T_1$. The AC signal appearing at the secondary of transformer $T_1$ is then applied to a triac bias circuit and turns triac $QAC_1$ ON.

Data relating to terminal station 11 is transmitted to each of the other terminal stations 12, 13, 14, and 16 in the loop shown in FIG. 1. For each station, input data for input modules in tha station is replaced with updated input information derived from the signals appearing at the inputs of the input modules, and the output data stored in the buffers of the output modules with addresses in that terminal station is updated with new data and connected to the output devices.

Receipt and Storage of Data at Communications Station

After passing through all of the terminal stations in the loop, the data train passes along communications link 17 to receiver 26 of communications station 10 where the data is decoded by data decoder 92 which receives its clock signal from the clock generator 31 of the phase lock loop circuit 50 which is identical to the phase lock loop used in the terminal station.

After receipt and decoding, decoded data from data decoder 92 is driven into shift register 96 and checked for parity and integrity by circuits 145 and 146. The decoded signal output of data decoder 92 is also connected to preamble detector 97. After the preamble is detected, preamble detector 97 increments bit time counter 98 and byte address counter 99 to indicate the address of the data word being received at a particular time. The incoming data is also checked by coincidence detector 145 which compares the data at the input of shift register 96 to the shifted data at its output and by parity check circuit 146. Address counter 99 transmits the address of the byte being received to byte address holding register 115 and in turn to address but 35 which addresses the proper location in RAM RECEIVE buffer 34 to receive that data. If the data returning to the communications station does not check out, it is not used to update buffer 34.

The data from shift register 96 is passed through an output driver 147 and a flip-flop 140 to a serial to parallel conversion circuit 117 and into a channel A buffer memory holding register 118. The channel A data is also fed to the D input of flip-flop 160 which acts as the ninth stage of a serial to parallel shift register when combined with the channel A holding register 161. Flip-flop 162 is the channel A parity flip-flop which captures the parity indicator (the signal is HIGH when parity is improper) and delays it one bit time to correspond with the loading of channel A holding register 161. Parity flip-flop 162 is driven by the parity and complement checking block 163. Identical circuitry including flip-flops 166, 167, and B channel holding register 168 processes the B channel information (received and decoded on circuitry identical to that shown on FIG. 2b) and drives multiplexer 169 which selects either A or B channel data for transmittal to lines 5 and 7 of data bus 36 when 170 is enabled. Lines 5 and 7 of data bus 36 are connected to the inputs to AND gates 171 and 172 which are also connected to receive inputs corresponding to the output and input status bits respectively. AND gates 171 and 172 have outputs corresponding respectively to the OSB and ISB and are connected to the status bit holding register 173.

Register 173 also receives further inputs from multiplex selector 175. Status bit holding register 173 holds the four bits. $ISB_o$ is the initial status bit stored at a given address at the time the system is powered up or during an initialize command. $OSB_o$ is the initial output status bit stored at a given address at power up or during an initialize command. When the initialize mode is enabled. multiplexer 175 replaces $ISB_O$ or $OSB_O$ with current values rather than those read from data bus 36 and lines 5 and 7. Register 173 also stores ISB which is the OR of the input status bit ($ISB_O$) just received with the input status bit stored the last time the address was processed. OSB is similarly the OR of the output status bit just received with the output status bit stored the last time the address was processed.

At the end of processing for a particular address, $ISB_c$ and $OSB_c$, the currently received status bits, are stored in RECEIVE buffer 34 at bits 6 and 4 respectively. If the scan is not an initialize scan, the old initial status bits $ISB_{O-1}$ and $OSB_{0-1}$ are returned to bits 7 and 5 of the buffer. During the initialize scan, multiplexer 175 selects ISB = $ISB_c + ISB_{0-1}$ to place in bits 7 and 5 of RECEIVE buffer 34.

System change bit counter 176 loads a 3 bit count from data bus 36 and RECEIVE buffer 34 which defines the fault status condition prevailing at the address being processed. The count is incremented or decremented according to logic count block 177 as described in further detail below.

The data in memory holding register 118 is fed to lines 8-15 of data bus 36 and to bit positions 8-15 in RECEIVE buffer 34 at an address location determined by the contents of the A channel byte address holding register 115 which are communicated to buffer memory address bus 35.

The RECEIVE buffers 34 store 16 bits of information for each I/O module address. Eight of the bits represent the most recently processed data bits for that I/O module and the other eight are status bits. $ISB_O$ and $OSB_O$ are the initial status bits recorded during the power-up sequence for that terminal station, and ISB and OSB are the terminals status for the last train received by the communications station. The next three status bits, $P_m$, $CB_2$, and $CB_1$, are encoded information relative to message faults for the terminal station involved, as shown in FIG. 12. The final status bit is a parity check for the eight data bits and seven status bits.

The probable cause of status bit conflicts, parity errors, and redundant word conflicts can be determined by an external computer routine or by examination of fault code bits on a monitor panel connected to read RECEIVE buffer 34. FIG. 13 summarizes the conclusions for these bit conditions.

As data is being received in communications station 10, it is read into RECEIVE buffer 34 as follows. For a particular byte address, the data stored in RECEIVE buffer 34 is read into register 180, the message assembly data register 1. The contents of the A channel memory holding register 118 are read into register 181, the message assembly data register 2. If the data received is valid, the new data from register 182 and the status information from register 180 are written into RECEIVE buffer 34. If the message is not valid, the original data is returned from register 181 to the RECEIVE buffer 34, and the status message is updated with the information in register 182.

In the simplest operating mode of the system, after all of the information has been received and stored in RECEIVE buffer 34, the contents of RECEIVE buffer 34 are read into register 182 and then into SEND buffer 33 to the same address locations.

Communications between Terminal Stations

FIG. 7 is a perspective view of the panel of a typical terminal station 11 showing four input/output modules 120-123 installed therein. For convenience, module 123 is shown in a partially inserted condition. A foldable handle 124 is used to simplify the removal of the module from the terminal station. The terminal block 126 for module 121 is shown with its protective cover 128 opened to expose the individual terminal connections. The terminal station address is selected by terminal address switch 60.

Figure 8:
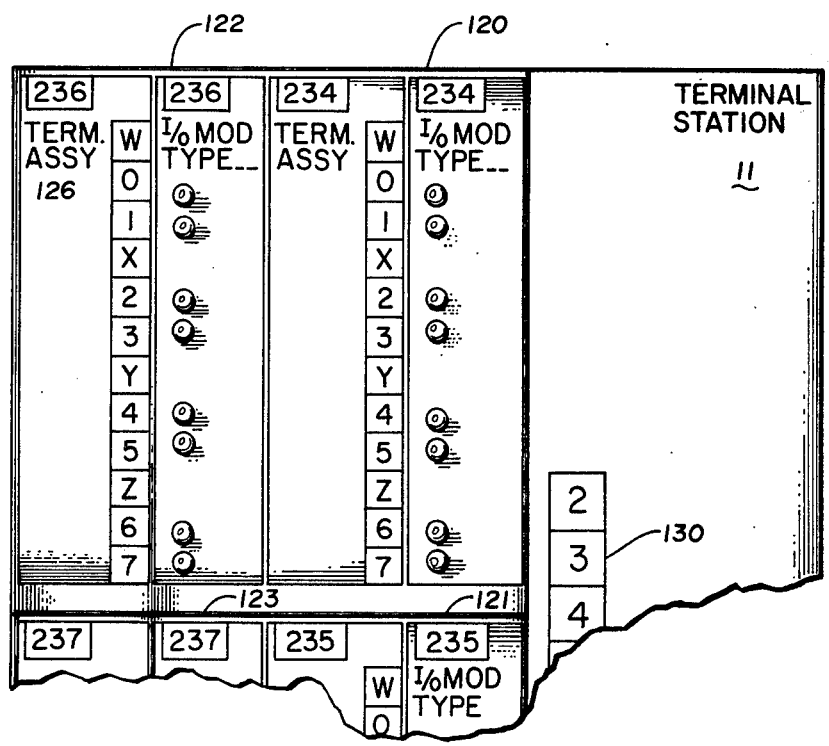
FIG. 8 shows additional detail of the terminal numbering on the panel of a terminal station.

Identification of the signals used in the system is by means of a four-digit octal number, $\phi_0\phi_1\phi_2\phi_3$, where $\phi$ may be any integer from 0-7. In the preferred embodiment shown, this number has physical significance. The three most significant digits ($\phi_0\phi_1\phi_2$) identify the space into which an I/O module is plugged, while the last digit $\phi_3$ identifies each field-wiring terminal as shown in FIGS. 7 and 8 and on terminal block 126 for example, and the signal associated with it. The space label $\phi_0\phi_1\phi_2$ is also referred to as the byte address of both the space and of the I/O module in that space.

The operator of the system establishes the initial byte address of each terminal station by setting the three octal switches 60 located within terminal station 11 and visible through cover 132. The address selected by switch 60 is assigned to the first module mounting location and its I/O module 120. Each succeeding space in terminal station 11 is then identified by the next higher byte address. Since its terminal station capacities of the preferred embodiment shown are provided in increments of four spaces or byte addresses, the least significant digit switch $\phi_2$ has only two positions, 0 and 4. The terminal station shown in FIG. 7 is a four-module station. There are 512 byte addresses possible in a system which results in a byte address range of 000-777 and a corresponding signal label range of 0000-7777.

The space number and corresponding module address is established by assigning address numbers to each space in sequence, starting with the station address which pertains to the module plugged in at position O. In effect, the address of any module position in a station equals the station address plus the space number.

Each I/O module connects to a block 12 field-wiring terminals such as 126 shown in FIG. 7. A LED signal status indicator 140 is located adjacent to each terminal numbered octally 0-7 which provides the fourth digit ($\phi_3$) of the signal number.

The field terminal numbering is shown more specifically in FIG. 8 which shows a portion of the panel layout of a terminal station including address switch 60 and portions of I/O modules 120, 121, 122, and 123. Thus, when, as in FIG. 8, the byte address switch 60 is set for a terminal station address of 234, the first I/O module 120 has an address beginning with the digits 234, and its eight terminals are 2340, et seq. Similarly, I/O module 121, since it is in space 1, has address 235, while modules 122 and 123 have addresses 236 and 237. The eight function terminals of module 122, in address 236, have designations 2360-2367. The remaining four terminals identified on each I/O module as W, X, Y, and Z are the "commons" as required by the electrical function which the particular module inserted in that location requires.

The signal capacities selected at communications station 10 using scan length switch 29 limit the active address range which may be selected for use on a terminal station. If a terminal station is assigned a byte address outside the selected range, its input and output signals will be ignored. FIG. 9 shows the byte and signal address ranges for selected signal capacities of 1024, 2048, and 4096 bits, as well as the 512 bits.

Control signals may be directed in the system from one address to another in three ways. The first way of directing control signals is by the same byte address or complementary addressing method. The other methods are by use of a readdressing prorammable read-only memory (PROM) or by use of an external computer.

Complementary Addressing

The same byte address method is utilized by coding two terminal stations in the system to the same byte address by setting the address switches 60 to the same byte address.

FIG. 10 shows a basic system utilizing complementary addressing. A communications station 10 is shown connected in a loop with a terminal station 11 and additional terminal stations 200, 201, and 202. Terminal stations 11, 201, and 202 are all eight-module terminal stations, while terminal station 200 is a four-module station. All four terminal stations have their switches 60 set to the same terminal station address 230. Thus, the module locations for each of those terminals begin with the address 230 and are consecutively numbered.

In the example shown in FIG. 11, terminal station 11 is interfaced with a relay controller 220 which contains the common control logic for three machines, 224, 225, and 226, whose operation is being controlled by the system. Machine A receives common control signals which govern its operation. The other two machines, 225 and 226, also receive identical common commands which originate from the common control logic portion of relay controller 220. The common control logic signals are applied to the terminals of an input module placed in the lowest-numbered position of terminal station 11. Since terminal station 11 has an address of 230, the lowest-numbered position of the input module receiving the common control logic signals from relay controller 220 is 230, and the individual signals in that module are 2301, etc.

Each of the terminal stations 200, 201, and 202 has an output module in the lowest-numbered module address. Since each of those terminal stations has a selectd byte address of 230, the address of those output modules is also 230. Control logic signals applied to input module 230 in terminal station 11 are transmitted through each of the terminal stations 200, 201, and 202 without modification and to each of the output modules having address 230 by the multiplex data train. Each of the output modules delivers the logic signals of byte address 230 to the respective machines 224, 225, and 226.

In addition to the common control logic commands generated by relay controller 220, individual machine control logic is also shown. The individual machine control logic receives signals from each of the machines to monitor its operation and delivers signals to each machine to alter its operation as required on an individual basis. For example, machine A delivers information on its status to input module 232 of terminal station 200. That information is sent in byte address position 232 around the loop through terminals 201 and 202, where it is merely retransmitted, and through communications station 10 to terminal station 11.

The information in byte 232 is received by the output module in address position 232 and transmitted to the control logic for machine A in relay controller 220. The individual logic commands for machine A are then generated by the control logic portion of relay controller 220 dedicated to machine A and delivered to input module 233 of terminal station 11. The machine A control logic commands are then transmitted in the data stream in position 233 and delivered to terminal station 200. The individualized commands for machine A are delivered directly to output module 233 which in turn delivers up to eight commands (with addresses 2330, 2331, et seq.) for machine A. The commands continue around the loop in address position 233 but are merely retransmitted by terminal stations 201, 202, and communications station 10 since none of them have a complementary module having an address of 233. The operation of machines B and C is similarly controlled by logic portions B and C of relay controller 220, utilizing address positions 234 and 235 for machine B and address positions 236 and 237 for machine C. It is clear that additional terminal stations having differing terminal station addresses can be used in the same loop within the limits of the loop signal capacity without having any effect on the operation of the particular terminal stations illustrated in FIG. 11.

Bit and Byte Readdressing

The readdressing programmable read-only memory, or PROM, portion 160 of communications station 10 provides another manner of transmitting data between terminal stations. This system offers greater flexibility than complementary addressing in situations where there are several terminal stations but only a few signals which must be exchanged between terminal stations. PROM 160 permits exchange of signals between stations having different addresses.

The byte readdressing programmable read-only memory (hereinafter referred to as the "PROM") 160 allows module-at-a-time or byte transfer from one byte address to a different byte address. The operation of the byte readdressing PROM is illustrated in simplified block diagram form in FIG. 11. The byte readdressing PROM readdresses signals after a data train has been completely returned to communications station 10 and stored in RECEIVE buffer 34 during the time interval that ZEROS are being transmitted in the time interval between transmission of the synchronization word and the transmission of the preamble word.

When the byte readdressing PROM option is utilized, communications station 10 reads the PROM 160 sequentially before transmitting the next train of data. Each address driving or reading into PROM 160 corresponds to an address in SEND buffer 33, and the information stored at a PROM location is the address of the desired data in RECEIVE buffer 34. Thus, using PROM 160 as an address cross index, communications station 10 can transfer data from each RECEIVE buffer 34 byte address (source byte) to the correct SEND buffer 33 address (destination byte). In this manner, the byte readdressing PROM, by relocating the signals prior to retransmission, allows signals to be communicated from one module to another module which has a different address.

A further readdressing PROM feature utilizing the same principles used in the byte readdressing PROM permits a similar transfer of individual discrete signals (bits) from one source byte to a differently addressed byte. The circuitry also permits a user to use the PROM to force a ZERO or a ONE bit into a particular bit position of a selected byte address. The specific circuitry for performing the bit readdressing is shown in FIG. 2a in conjunction with message assembly data registers 1 and 2.

Computer Readdressing

An external computer may also be interfaced with data bus 36 and address bus 35 of communications station 10 for readdressing data. This is useful for any system where the routing of signals must be changed frequently or where an external computer is interfaced with a system for other reasons and is convenient to use. Utilizing a computer, a user of the system can access selectively any or all of the signals present in the system and to act as a source for any output. The computer can read communications station SEND buffer 33, and RECEIVE buffer 34 at any time but can only alter RE- CEIVE buffer 34 after one data train has been completely returned to the communications station during the generation of ZERO words prior to the generation of the next sync word and commencement of the transmission of the next pulse train. The operation of the computer, in performing is readdressing function, is similar to that described for the byte and bit readdressing PROM but is controlled by the software of the computer itself.

Reconfigurable System

FIG. 14 shows, in simplified block diagram form, the system connected using reconfigurable communications channels A and B. Each terminal station is configured with duplicate receiving and transmitting circuitry. The information from the communications station buffer is transmitted around the loop in one direction through channel A and around the loop in the other direction through channel B. Assuming that the channels are operating normally, only the channel A data is actually being used by the system, and no interaction of data between the A and B channels occurs in the terminal stations.

If a cable between two terminals is severed, as shown in FIG. 15 by the Xs appearing between terminal stations 11 and 12, it causes the B channel receiver of terminal station 11 to fail to receive an input signal so that it loses its phase lock loop signal and actuates indicator 57, as shown in FIG. 3a. This causes terminal station number 11 to switch over, as shown in FIG. 15, so that the output of the terminal station is shifted from the A channel transmitter to the B channel transmitter, and the input to the B channel receiver is disconnected. Similarly, the failure of the A channel receiver of terminal station 12 to receive an input signal because of the break in the A channel communications link causes that terminal station to reconfigure and connect the B channel receiver to supply the input signal to the input/output circuitry of that terminal station and to connect the output of the terminal station to the A channel transmitter. Thus, in the presence of the break in the communications channels between terminals 11 and 12, two loops are formed, one comprising the communications station and terminal 11 and the other comprising the communications station and terminals 12 and 13.

If only a single break occurs in channel A, terminal station 12 will force a break on B channel so that reconfiguration will occur.

When the interruption of the communications link causes the transmitter for the next downstream terminal station in the sequence to transmit a continuous string of ONES over the remaining intact portion of the communications link to the communications station, the byte address of the station immediately downstream from the break in the channel can be determined when the 20 ONES detector 185, in the communications station shown in FIGS. 2a through 2d, detects the presence of 20 ONES in a sequence. As soon as this condition is detected at the communications station, the address of the terminal station immediately downstream from the break can be determined by reading the address count then present in the communications station byte address counter 99.

Error Detection and Identification

Each of the terminal stations has red and green light emitting diode, or LED, indicators, as shown in FIG. 7, to display information helpful for fault identification and field servicing. If each of the voltages generated within the power supply of the station is within specified operating ranges, and if ambient temperature is within permissible limits, the "power and temperature normal" indicator is lighted. Terminal stations also detect missing I/O modules or blown fuses on fused output modules. Should either of these conditions be present, the red "module fault" indicator is lighted.

If the terminal station does not receive a pulse train with valid messages once every 125 milliseconds, the red "scan fault" indicator is lighted. If a communications link fault exists, the appropriate green "communications link operate" indicator 57 is turned off. A link fault can originate from the preceding station (due to a faulty transmitter, etc.), from the cable (from a loose connection, broken, shorted, or grounded conductor), or from the station's own receiver electronics (faulty receiver, etc.).

If the system is connected using reconfigurable communication links and a channel failure occurs, the stations on either side of the fault reconfigure and their red "communications link fault" indicators are activated. When a communications link fault is detected by a terminal station, the station transmits a link fault pulse train of consecutive ONES to the communications station to permit identification of the location of the fault.

The pulse train utilized in the system carries terminal station status information in addition to data bits. The pulse train leaves the communications station with input and output status bits set at 0, and as it passes through each terminal station, one status bit is changed corresponding to each module address where a module is in place. Thus, when the system is first activated, part of the initialization process includes storage of the status bits received by the communications station from the returning pulse train. Thus, a memory inventory of the I/O modules installed at each address is provided.

Terminal station fault indications are conveyed by forcing data bits to improper values for either one address or all the addresses associated with the station, for all even-numbered bytes, or for all odd-numbered bytes. Each combination represents a separate fault problem which may be decoded by the monitor panel.

The system also has other failure detecting modes. If a terminal station is improperly operating because it is unpowered, all data received at its input is directly transmitted through to its output through a set of contacts.

For a particular terminal station, power may be disconnected due to the action of an alarm relay contact in the station which can be actuated in a number of ways. The alarm relay can be actuated by an abnormal power condition at the terminal station power supply. Actuation of the alarm relay also causes de-energization of all output signals from the terminal station output modules. The alarm is also actuated by a missing I/O module, a blown fuse in an output module, an over-temperature alarm, or by the loss of either the clock signal or clock synchronization, failure to detect a data train for 100 milliseconds, or the detection of parity errors with every data train for 100 milliseconds, or the detection of a broken wire on a channel.

In the case where the terminal station has a missing module or where a blown fuse occurs on an output module, the output module is permitted to update its outputs with new outputs. If both a missing module and a blown fuse are present in a terminal station, the setting of the ISB and OSB by the module is inhibited.

If the terminal station has the 24-volt supply alarm is actuated for the station, the four data bytes associated with the station have their parity bit inverted to indicate the presence of a +24 volt (too low) or over-temperature alarm fault condition.

If an incoming data byte is received with either bad parity or a scrambled byte where the data and its complement do not match, the new output data received in the bytes for that terminal station are inhibited. The new input data to be received from the input modules of that terminal station are not inhibited in their transfer of new outputs onto the communications link, although the OSB may be scrambled.

If the data train bytes for the particular terminal station address are received with parity errors each time the data is received during a 100-millisecond time period, or if no data train is received for 100 milliseconds, the outputs for the terminal station are de-energized. The data train can pass through the terminal station even after the outputs are disabled.

Submultiplexing

The information transferring capacity of the time division multiplexed loop can be significantly expanded by a technique hereinafter referred to as submultiplexing. Submultiplexing requires no change to the communication station or terminal station shown in FIGS. 2a through 2d and 3a and 3b but merely utilizes input and output modules which are slightly modified from those shown in FIGS. 5 and 6 to perform according to a submultiplexing protocol. Utilizing submultiplexing, the input and output modules can have their external signal connection capacity expanded from a single byte (8 bits) to any number of bits.

In the context of the present invention, submultiplexing merely means carrying of data from one location to another using multiplex fixed length words to carry a single data message. Submultiplexing can utilize either two adjacently addressed bytes communicated by the loop in a single data train or it may utilize the same byte address location in two successive data trains to assemble 16 bits of information for multiplexing purposes as follows.

Analog input signals are digitized by an analog input module using conventional analog-to-digital conversion techniques to form a 12-bit representation of an input signal. In the preferred embodiment of the system, analog-to-digital input modules and digital-to-analog output modules each handle four external analog (voltage or current) signals. The digital 12-bit representation of the analog signals is communicated on the loop between analog input and analog output modules placed at different physical locations at terminal stations and having the same bit addresses by submultiplexing. The analog modules occupy a single byte address space and utilize two successive trains of the data train to assemble and encode and decode the 16 bits of information required for each of the signals.

Submultiplexed information carried by the first data train contains a two-bit field called "tag" which identifies one of the four analog channel 12-bit digital representations and contains the five most significant bits of the digital number. As shown in FIG. 16, the eighth bit in the message identifies the message as containing the tag and five most significant bits of data.

As also shown in FIG. 16, the submultiplexed information communicated by the second train of data contains the remaining seven bits of data or the least significant bit, and the eighth bit in the message is again used to identify the message as the portion containing the least significant seven bits of the 12-bit digital representation of the analog signal associated with the tag of the previous message.

It is clear that submultiplexing as described above is not limited to the transmission of digital values representing analog signals. Digital submultiplexing modules patterned like the analog modules discussed above with respect to data transmission protocol may be utilized to submultiplex four groups each of 12-bit digital signals.

The submultiplexed signals circulating in the system are stored in the communication station RECEIVE buffer 34 in separate locations in the form analogous to that used to store other digital data with status information. The information may also be stored in an analog signal buffer in a format including all 12 significant digits and the tag in "packed" form utilizing the equipment shown in FIGS. 2a through 2d.

It will, of course, be understood that various changes may be made in the form, details, arrangements, and proportions of the parts discussed above without departing from the scope of the invention which consists of the matter shown and described herein set forth in the appended claims.

What I claim is:

1. A reconfigurable loop structured communications system comprising:

a main loop and a backup loop parallel to each other and each capable of circulating data signals in opposite directions;

a communications unit connected to both of said loops for controlling the flow of data circulating therein;

a plurality of terminal units, each including main and backup receiver means for receiving data from said respective loops and each including main and backup transmitter means for transmitting data to said respective loops;

switching means located in each of said terminal units, said switching means operative in a first condition to communicate signals from said main receiver means to said main transmitter means and also for connecting said backup receiver means to said backup transmitter means, said switching means operative in a second condition to disconnect the input to said main transmitter means from said main receiver means and operative to connect said main receiver means to said backup transmitter means and to disconnect said backup receiver means, said switching means operative in a third condition to connect said backup receiver means to said main transmitter means and operative to disconnect said main receiver means and said backup transmitter means; and first control means located in each of said terminal units, said first control means responsive to an interruption of said data signals in a portion of said main loop between a first and a second of said terminal units and operative to cause switching of said switching means in said first terminal unit from said first to said second condition and operative to cause switching of said switching means in said second terminal unit from said first to said third condition to reconfigure said communications system into a two-loop system to permit all of said terminal units to continue to function despite the interruption of said loop between said first and said second terminal units.

2. The system claimed in claim 1 wherein failure indicator means are located in each of said terminal units and apply a characteristic failure signal to said backup transmitter means of said second terminal and wherein said communications unit includes means responsive to said characteristic failure signal to define the location of said failure in said main loop.

3. A reconfigurable loop structured control system comprising:
a main loop and a backup loop parallel to each other and each capable of circulating data signals in opposite directions;
a communications unit connected to both of said loops for controlling the flow of data circulating therein;
a plurality of terminal units, each including main and backup receiver means for receiving data from said respective loops and each including main and backup transmitter means for transmitting data to said respective loops, each terminal unit also including interface means for communicating data intended to said terminal unit to output terminals of said terminal units for communication with units external to said communications system;
switching means located in each of said terminal units, said switching means operative in a first condition to communicate signals from said main receiver means through said interface means to said main transmitter means and also for connecting said backup receiver means to said backup transmitter means, said switching means operative in a second condition to disconnect the input to said main transmitter means from said interface means and said main receiver means and operative to connect said main receiver means through said interface means to said backup transmitter means and to disconnect said backup receiver means, said switching means operative in a third condition to connect said backup receiver means through said interface means to said main transmitter means and operative to disconnect said main receiver means and said backup transmitter means; and
first control means located in each of said terminal units, said first control means responsive to an interruption of said data signals in a portion of said main loop between a first and a second of said terminal units and operative to cause switching of said switching means in said first terminal unit from said first to said second condition and operative to cause switching of said switching means in said second terminal unit from said first to said third condition to reconfigure said communications system into a two-loop system to permit all of said terminal units to continue to function with external units despite the interruption of said loop between said first and said second terminal units.

4. The system claimed in claim 3 wherein failure indicator means are located in each of said terminal units and apply a characteristic failure signal to said backup transmitter means of said second terminal and wherein said communications unit includes means responsive to said characteristic failure signal to define the location of said failure in said main loop.

5. In a time division multiplex loop communications system including a communications station for transmitting a data pattern to said loop comprising a preamble word and a plurality of fixed length data words and for receiving, storing, and retransmitting said data pattern, a plurality of terminal stations connected in said loop in series with said communications station, each of said terminal stations comprising:
receiver means for receiving and decoding the data pattern received from said loop;
detector means coupled to said receiver means for recognizing said preamble word;
counter means for counting the number of fixed length words received by said terminal station subsequent to the identification of said preamble word and generating an output signal representative of the byte address of the data word being received;
control means responsive to the output signal from said counter means to generate a control signal when the byte address of the data work being received corresponds to a pre-selected range of byte addresses assigned said terminal station;
interface means connected to said receiver means, said interface means responsive to said control means to receive signals from said receiver means only when said control signal is present, said interface means including at least one sequentially numbered connector location for receiving either input or output modules, each of said connector locations having a particular byte address within the range of byte addresses selected for said terminal station;
a plurality of input modules, each of which is mounted in particular connector locations in said interface means, said input modules constructed and arranged to receive input data from sources external to said system and insert the data in digital form into the data pattern at a word location having its byte address determined by the pre-selected byte address of the terminal station and the connector number of the connector means into which said input module is inserted in said interface means;
a plurality of output modules, each of which is mounted in particular connector locations in said interface means, said output modules constructed and arranged to transmit data signals to utilizing means external to said system, said data signals being determined by data carried by said data stream at a byte address determined by the pre-selected byte address for said terminal station and the byte address of selected location in said interface means into which said output module is inserted; and
transmitter means operative to encode and transmit data applied to its input to said loop, said transmitter means receiving its input from said receiver means when said control signal is generated by said control means, said transmitter means receiving its input from said interface means and one of said input modules when said control signal is generated and an input module is mounted in the connector having the byte address of the data being received, said transmitter means receiving its input from said receiver means when said control signal is generated and an output module is mounted in the connector having the byte address of the data being received.

6. The invention claimed in claim 5 wherein the byte address for each of said terminal stations is determined by setting a selector switch mounted on said terminal station.

7. The invention claimed in claim 6 wherein one input module and at least one output module are assigned to the same byte addresses in different terminal stations to permit direct communication of information from said input module in one terminal station to said each of said output modules having the same address in a different terminal station.

8. The invention claimed in claim 5 wherein said data pattern is Manchester coded and said receiver means of each terminal station includes a phase lock loop oscillator circuit to generate clock signals for decoding and encoding data.

9. The invention claimed in claim 5 wherein incoming data at each terminal station and the communications station is checked for validity including parity and redundancy before being utilized.

10. The invention claimed in claim 5 wherein said communications station includes means for rearranging the byte address location of data words in said data pattern to provide for communication between input and output modules having different byte addresses.

11. The invention claimed in claim 5 wherein the initial data pattern transmitted to said loop is comprised of data words comprised entirely of ZEROS and each input module and each output module inserts a data bit in a particular bit location in the data word having a byte address corresponding to the byte address of the module to make available at said communications station a listing of the byte address locations being used and whether the location is filled by an input or by an output module.

12. The invention claimed in claim 5 wherein error detecting means are included in said terminal station to detect errors in data received in said station and wherein further control means are also provided, said further control means being responsive to detection of errors by said error detecting means to block transmission of error containing data to said output modules thereby preserving integrity of the output signals by allowing said output module to continue to operate using the last previously received valid data.

13. In a time division multiplex loop communications system for communicating data between a plurality of terminal stations and a communications station connected in a serial loop, a communications station for controlling the flow of data through said loop, said communications station comprising:
  a send buffer for storing a plurality of fixed length words, each of which includes digital data status information concerning the operating condition of said system;
  an address register loaded with the storage locations of each word stored in said send buffer;
  data transmitting means for transmitting a preamble word having a particular structure and for transmitting in sequence the data contents of said send buffer as directed by said address register;
  receiver means for receiving and decoding data received from said loop;
  address counter means coupled to said receiver means for recognizing said preamble word, the count stored in said counter means being incremented upon receipt of each word after the preamble word;
  a receive buffer for storing a plurality of fixed length words, each of which includes digital data status information concerning the operating condition of the system, said data received from means and stored at address locations determined by said byte address holding register;
  a byte address holding register which receives its input from said address counter means to control the storage address in said receive buffer of each data word received subsequent to receipt of the preamble word; and
  means for transferring the contents of said receive buffer to said send buffer for retransmission to said terminal stations in the same address locations relative to said preamble word.

14. A method of transmitting data between a plurality of terminal units connected in a serial loop comprising the steps of:
  forming a train of fixed length data bytes, each of which has a specific byte address corresponding to the number of bytes between it and the beginning of train;
  preceding the train with a preamble word having a distinctive coding pattern;
  transmitting said preamble word and said train to said loop;
  preceding said preamble and said train with a synchronization pattern to permit each of said terminal units to derive clock information for decoding and utilizing data carried by said train;
  detecting at each of said plurality of terminal stations the receipt of said preamble and counting the number of data bytes received subsequent to said preamble;
  utilizing at each of said terminal stations only those data bytes having byte addresses corresponding to a range of byte addresses associated with said terminal station while all other data bytes are retransmitted; and
  receiving said train at a communications station and storing it for retransmission through said loop.

15. The method of claim 14 wherein each data byte is comprised of 20 bits with the first 8 bits comprising the data in inverted form and the 10th through 18th bits comprising the data in uninverted form and whereby the integrity of said data is checked at each terminal station and at said communications station by passing each decoded data byte through a ten-stage shift register and comparing the input data to the shifted data to verify that the word and its complement have been received without error.

16. In a time division multiplexed loop control system including a communications station for transmitting a data pattern to said loop comprising a preamble word and a plurality of fixed length data words and for receiving, storing, and retransmitting said data pattern:
  a first terminal station including an input module, said input module being constructed and arranged to receive input data from a source external to said system and to insert said input data in said data pattern at a particular byte address position;
  a second terminal station connected in said loop in series with said first terminal station and said communications station, said second terminal station including an output module for transmitting data signals to data utilizing means external to said system from the particular byte address position in said data pattern which corresponds to the byte address position of said input module of said first terminal station.

17. The system claimed in claim 16 including a third terminal station connected in said loop in series with said communications station and said first and said second terminal stations, said third terminal station including an output module having a byte address identical to the byte address of said output module of said second terminal station for receiving output data from the particular byte address of said data pattern fed by said input module of said first terminal means.

18. The invention claimed in claim 16 wherein said communications station includes further programmable means for transferring data from the byte address of an input or an output module of said first terminal station in which it is received from said data pattern to a new byte address corresponding to the byte address of the output module of said second terminal station for transmission to the output module of said second terminal station.

19. The invention claimed in claim 16 wherein said input module and said output module each contain multiple terminals for receiving or transmitting information represented by a voltage or current signal and wherein the information for each of said terminals is correlated to a particular bit position in the fixed length data word having a byte address corresponding to the byte address of the input and output module.

20. The invention claimed in claim 19 wherein said communications station also includes further programmable means for transferring data from the byte address of an input or an output module of said first terminal station in which it is received from said data pattern to a new byte address corresponding to the byte address of the output module of said second terminal station for transmission to the output module of said second terminal station.

21. The invention claimed in claim 20 wherein said communications station includes still further means for transferring data from a particular bit position in a data word having a first byte address to a different bit position in a data word having a second byte address.

22. The system claimed in claim 16 wherein each terminal station includes means for inserting a signal into a particular bit location of the data word having a byte address corresponding to the byte address of an input or an output module in said terminal station to indicate whether the particular module at a particular byte address is an input module or is an output module.

23. The invention claimed in claim 16 wherein each terminal station includes means for by-passing the input of disabled terminal stations directly to the output to permit enabled terminal stations to continue to operate.

24. The invention claimed in claim 16 wherein said input module of said first terminal station includes submultiplex coding means for communicating data having a number of data bits in excess of the number of data carrying bit positions in said fixed length of data words by inserting a portion of said data bits in a first data word and the remainder of said data bits in a second data word and wherein said output module in said second terminal means includes submultiplex decoding means for receiving said first and said second data word and reassembling said data bits for transmission for data utilizing means external to said system.

25. The invention claimed in claim 24 wherein said modules include means for handling multiple data items by inserting in said first data word or said second dat word tag information to identify the particular data item in said input and said output module whose information is being transferred.

26. The invention claimed in claim 25 wherein either said first or said second data word contains information indicating whether it contains the first portion of said data byte or the remaining data byte.

27. The invention claimed in claim 24 wherein said input and said output modules are constructed and arranged to insert said input data into data pattern and receive data from said data pattern at at least two bit address positions for each data pattern transmitted.

28. The invention claimed in claim 24 wherein said first data word and said second data word have the same byte address position and are transmitted on alternate cycles of said data pattern.

* * * * *

UNITED STATES PATENT AND TRADEMARK OFFICE
CERTIFICATE OF CORRECTION

PATENT NO. : 4,144,410

DATED : March 13, 1979

INVENTOR(S) : Charles E. Flickinger and Russell P. Schuchmann

Page 1 of 2

It is certified that error appears in the above-identified patent and that said Letters Patent are hereby corrected as shown below:

Column 1, line 32, delete "installas" and insert --installs--.

Column 1, line 56, after "and" insert --codify any--.

Column 2, line 6, delete "multiplexe" and insert --multiplex--.

Column 3, line 50, delete "deliveres" and insert --delivers--.

Column 4, line 10, after "3b" insert --.--.

Column 5, line 3, delete "work" and insert --word--.

Column 5, line 14, delete "fist" and insert --first--.

Column 8, line 59, delete "donditioning" and insert --conditioning--.

Column 9, line 12, delete "end" and insert --even--.

Column 10, line 54, delete "enabled." and insert --enabled,--.

Column 13, line 29, delete "selectd" and insert --selected--.

UNITED STATES PATENT AND TRADEMARK OFFICE
CERTIFICATE OF CORRECTION

PATENT NO. : 4,144,410

DATED : March 13, 1979

INVENTOR(S) : Charles E. Flickinger and Russell P. Schuchmann

It is certified that error appears in the above-identified patent and that said Letters Patent are hereby corrected as shown below:

Column 16, line 20, delete "munication" and insert
--munications--.

Column 20, line 18, delete "work" and insert
--word--.

Column 24, line 24, delete "dat" and insert
--data--.

Signed and Sealed this

Twenty-second Day of May 1979

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,144,410

DATED : March 13, 1979

INVENTOR(S) : Charles E. Flickinger and Russell P. Schuchmann

It is certified that error appears in the above-identified patent and that said Letters Patent are hereby corrected as shown below:

Column 1, line 63, delete "trasmit" and insert --transmit--.

Column 2, line 7, delete "assures" and insert --assure--.

Column 4, line 55, delete "averge" and insert --average--.

Column 4, line 60, delete "assurs" and insert --assures--.

Column 5, line 20, delete "selcts" and insert --selects--.

Column 5, line 35, delete "an", second occurrence, and insert --and--.

Column 5, line 40, delete "Swiching" and insert --Switching--.

Column 5, line 52, delete "work" and insert --word--.

UNITED STATES PATENT AND TRADEMARK OFFICE
CERTIFICATE OF CORRECTION

PATENT NO. : 4,144,410
DATED : March 13, 1979
INVENTOR(S) : Charles E. Flickinger and Russell P. Schuchmann It is certified that error appears in the above-identified patent and that said Letters Patent are hereby corrected as shown below:

Column 9, line 56, delete "tha" and insert --that--.

Signed and Sealed this

Twentieth Day of November 1979

[SEAL]

Attest:

RUTH C. MASON
Attesting Officer

LUTRELLE F. PARKER
Acting Commissioner of Patents and Trademarks